United States Patent
Cimberio et al.

(10) Patent No.: US 12,140,333 B2
(45) Date of Patent: Nov. 12, 2024

(54) PROCESS OF CONTROLLING AN AIR-CONDITIONING AND/OR HEATING PLANT AND RELATED AIR-CONDITIONING AND/OR HEATING PLANT

(71) Applicant: FIMCIM S.p.A., Milan (IT)

(72) Inventors: Roberto Cimberio, Fraz. Vacciago (IT); Tiziano Guidetti, Borgomanero (IT)

(73) Assignee: CIMBERIO HOLDING S.R.L., Milan (IT)

( * ) Notice: Subject to any disclaimer, the term of this patent is extended or adjusted under 35 U.S.C. 154(b) by 373 days.

(21) Appl. No.: 17/734,978

(22) Filed: May 2, 2022

(65) Prior Publication Data

US 2022/0364757 A1   Nov. 17, 2022

(30) Foreign Application Priority Data

May 3, 2021   (IT) ........................ 102021000011261

(51) Int. Cl.
*F24F 11/63*   (2018.01)
*F24F 5/00*    (2006.01)
(Continued)

(52) U.S. Cl.
CPC ............ *F24F 11/63* (2018.01); *F24F 5/0003* (2013.01); *F24F 11/70* (2018.01); *F24F 2110/10* (2018.01);
(Continued)

(58) Field of Classification Search
CPC ...... F24F 11/63; F24F 5/0003; F24F 2110/10; F24F 2140/12; F24F 2140/20;
(Continued)

(56) References Cited

U.S. PATENT DOCUMENTS 4,708,287 A * 11/1987 De Wit ............... F24D 19/1033
                                                237/8 R
10,443,862 B2   10/2019 Guidetti et al.
(Continued)

FOREIGN PATENT DOCUMENTS

EP    2 376 841      2/2019
WO    2021/013398    1/2021

OTHER PUBLICATIONS

Search Report and Written Opinion for IT 202100011261, dated Jan. 25, 2022, 8 pages.

*Primary Examiner* — Phuong H Nguyen
(74) *Attorney, Agent, or Firm* — Nixon & Vanderhye P.C.

(57) ABSTRACT

Control process of a thermal plant including a distribution circuit for a carrier fluid having a delivery line and a return line, a central thermal treatment group placed on the circuit, and channels, each of which is hydraulically interposed between the delivery line and the return line to serve respective environments. For each of the channels, the plant includes a respective exchange unit, a flow regulator to regulate a flow rate of carrier fluid through in the respective channel, an ambient temperature detector, a temperature detector of the carrier fluid for detecting a delivery temperature of the carrier fluid in each channel, and a return temperature of the carrier fluid in each channel. The process also includes a thermal optimization procedure as a function of ambient temperature, delivery temperature and return temperature of the carrier fluid.

20 Claims, 2 Drawing Sheets

(51) Int. Cl.
  *F24F 11/70*      (2018.01)
  *F24F 110/10*     (2018.01)
  *F24F 140/12*     (2018.01)
  *F24F 140/20*     (2018.01)
  *F24F 140/40*     (2018.01)
  *F24F 140/60*     (2018.01)

(52) U.S. Cl.
  CPC ....... *F24F 2140/12* (2018.01); *F24F 2140/20* (2018.01); *F24F 2140/40* (2018.01); *F24F 2140/60* (2018.01)

(58) Field of Classification Search
  CPC ....... F24D 2220/0292; F24D 2220/042; F24D 2220/044; F24D 2220/046
  See application file for complete search history.

(56) References Cited

U.S. PATENT DOCUMENTS

| | | | |
|---|---|---|---|
| 10,465,932 B2 | 11/2019 | Guidetti et al. | |
| 2017/0028813 A1* | 2/2017 | Enomoto | B60H 1/00899 |
| 2017/0067662 A1* | 3/2017 | Guidetti | F24F 11/30 |

* cited by examiner

PROCESS OF CONTROLLING AN AIR-CONDITIONING AND/OR HEATING PLANT AND RELATED AIR-CONDITIONING AND/OR HEATING PLANT

RELATED APPLICATION

This application incorporates by reference and claims priority to Italian Patent Application 102021000011261, filed on May 3, 2021.

FIELD OF THE INVENTION

The present invention concerns an air conditioning and/or heating plant and a process for controlling said plant. The invention can be used in both civil and industrial applications and is advantageously suitable for the control and energy optimization of hydronic plants.

BACKGROUND ART

As known, heating and/or air conditioning plants are increasingly used to maintain environments, such as environments in residential or business units, in desirable temperature and/or humidity conditions.

Said plants are generally supplied by a central unit, for example comprising a heating unit (such as a boiler, a heat pump or other) and/or a cooling unit, which sends a carrier fluid with the desired properties in terms of temperature, flow rate and specific heat into a suitable distribution circuit. The distribution circuit, in correspondence with the environments to be served, then includes one or more heat treatment units which exchange heat with the environment.

The control of air-conditioning and/or heating plants is rather complex, particularly when there are various environments served by the same plant, which is therefore equipped with numerous heat exchange units: in this regard, consider plants for offices, hotels, or in general buildings in which there are numerous distinct and/or separate environments on several living levels.

It is evident that setting the initial conditions of the plant and checking that the desired thermal conditions are met in each environment is extremely complex.

SUMMARY

Aspects of the invention are described below.

A 1st aspect is directed to a process for controlling a plant (1) for air conditioning and/or heating, said plant (1) being of the type comprising:
at least one circuit (2) for distributing a carrier fluid, said at least one circuit (2) comprising:
a. at least one delivery line (3) for the carrier fluid,
b. at least one return line (4) for the carrier fluid, and
at least one central heat treatment group (6) placed on said at least one circuit (2);
two or more channels (5) each of which is hydraulically interposed between said delivery line (3) and said return line (4) in order to serve respective environments to be conditioned and/or heated,
for each of said channels (5), the plant (1) also comprising:
a. at least one respective thermal exchange unit (7) operating on each of said channels (5) in order to serve a respective environment to be air conditioned and/or heated,
b. at least one flow regulator (8) operating on each of said channels (5) and configured in order to regulate a flow of carrier fluid crossing the respective channel (5),
c. at least one ambient temperature detector (30) for each channel (5), said at least one ambient temperature detector (30) being configured for detecting an ambient temperature relative to the environment to be air conditioned and/or heated served by said channel (5),
d. at least one temperature detector for the carrier fluid (10) operating on each of said channels (5), said at least one temperature detector for the carrier fluid (10) being configured for detecting:
i. a delivery temperature of the carrier fluid in each channel (5), said delivery temperature being detected in an upstream section (5a) of the channel (5) placed upstream with respect to all the thermal exchange units (7) of said channel (5),
ii. a return temperature of the carrier fluid in each channel (5), said return temperature being detected in a downstream section (5b) of the channel (5) placed downstream with respect to all the thermal exchange units (7) of said channel (5),
wherein said process includes a thermal optimization procedure comprising the steps of:
calculating, for each channel (5), a respective environmental differential index representing a difference between:
a. a parameter representative of said delivery temperature and/or return temperature of the carrier fluid of the respective channel (5), and
b. said ambient temperature of the environment served by the respective channel (5),
calculating, for each channel (5), a respective differential fluid index representing a difference between the flow and return temperatures of the carrier fluid;
comparing, for each channel (5), said respective environmental differential index with a respective environmental threshold parameter, so that:
a. if said environmental differential index is, in absolute value, lower than said environmental threshold parameter, the process comprises the step of driving the opening of the flow regulator (8) of the respective channel (5);
comparing, for each channel (5), said differential fluid index with a respective threshold fluid parameter, so that:
a. if said differential fluid index is, in absolute value, lower than said threshold fluid parameter, the process comprises the step of driving the closing of the flow regulator (8) of the respective channel (5).

A 2nd aspect is directed to a process for controlling a plant (1) for air conditioning and/or heating, said plant (1) being of the type comprising:
at least one circuit (2) for distributing a carrier fluid, said at least one circuit (2) comprising:
a. at least one delivery line (3) for the carrier fluid,
b. at least one return line (4) for the carrier fluid, and
at least one central heat treatment group (6) placed on said at least one circuit (2);
two or more channels (5), each of which is hydraulically interposed between said delivery line (3) and said return line (4) in order to serve respective environments to be air conditioned and/or heated,
for each of said channels (5), the plant (1) also comprising:

a. at least one respective thermal exchange unit (7) operating on each of said channels (5) in order to serve a respective environment to be air conditioned and/or heated,
b. at least one flow regulator (8) operating on each of said channels (5) and configured in order to regulate a flow of carrier fluid crossing the respective channel (5),
c. at least one ambient temperature detector (30) for each channel (5), said at least one ambient temperature detector (30) being configured for detecting an ambient temperature relative to the environment to be air conditioned and/or heated served by said channel (5),
d. at least one temperature detector for the carrier fluid (10) operating on each of said channels (5), said at least one temperature detector for the carrier fluid (10) being configured for detecting:
i. a delivery temperature of the carrier fluid in each channel (5), said delivery temperature being detected in an upstream section (5a) of the channel (5) placed upstream with respect to all the thermal exchange units (7) of said channel (5),
ii. a return temperature of the carrier fluid in each channel (5), said return temperature being detected in a downstream section (5b) of the channel (5) placed downstream with respect to all the thermal exchange units (7) of said channel (5),
wherein said process includes a thermal optimization procedure comprising the steps of:
calculating, for each channel (5), a respective environmental differential index representative of a difference between:
a. a parameter representative of said delivery temperature and/or return temperature of the carrier fluid of the respective channel (5), and
b. said ambient temperature relative to the environment served by the respective channel (5),
comparing, for each channel (5), said respective environmental differential index with a respective environmental threshold parameter, so that:
a. if said environmental differential index is, in absolute value, lower than said environmental threshold parameter, the process comprises the step of driving the opening of the flow regulator (8) of the respective channel (5).

In a 3rd aspect according to the preceding aspect, the thermal optimization procedure further comprises:
calculating, for each channel (5), a respective differential fluid index representative of a difference between the delivery temperature and return temperature of the carrier fluid;
comparing, for each channel (5), said differential fluid index with a respective threshold fluid parameter, so that:
a. if said differential fluid index is, in absolute value, lower than said threshold fluid parameter, the process comprises the step of driving the closing of the flow regulator (8) of the respective channel (5).

A 4th aspect is directed to a process for controlling a plant (1) for air conditioning and/or heating, said plant (1) being of the type comprising:
at least one circuit (2) for distributing a carrier fluid, said at least one circuit (2) comprising:
a. at least one delivery line (3) for the carrier fluid,
b. at least one return line (4) for the carrier fluid, and
at least one central thermal treatment group (6) placed on said at least one circuit (2);
two or more channels (5), each of which is hydraulically interposed between said delivery line (3) and said return line (4) in order to serve respective environments to be air conditioned and/or heated,
for each of said channels (5), the plant (1) also comprising:
a. at least one respective thermal exchange unit (7) operating on each of said channels (5) in order to serve a respective environment to be air conditioned and/or heated,
b. at least one flow regulator (8) operating on each of said channels (5) and configured in order to regulate a flow of carrier fluid crossing the respective channel (5),
c. at least one temperature detector for the carrier fluid (10) operating on each of said channels (5), said at least one temperature detector for the carrier fluid (10) being configured for detecting:
i. a delivery temperature of the carrier fluid in each channel (5), said delivery temperature being detected in an upstream section (5a) of the channel (5) placed upstream with respect to all the thermal exchange units (7) of said channel (5),
ii. a return temperature of the carrier fluid in each channel (5), said return temperature being detected in a downstream section (5b) of the channel (5) placed downstream with respect to all the thermal exchange units (7) of said channel (5),
wherein said process includes a thermal optimization procedure comprising the steps of:
calculating, for each channel (5), a respective differential fluid index representative of a difference between the delivery and return temperatures of the carrier fluid;
comparing, for each channel (5), said differential fluid index with a respective threshold fluid parameter, so that:
a. if said differential fluid index is, in absolute value, lower than said threshold fluid parameter, the process includes the step of driving the closing the flow regulator (8) of the respective channel (5).

In a 5th according to the preceding aspect, the plant is of the type comprising at least one ambient temperature detector (30) for each channel (5), said at least one ambient temperature detector (30) being configured to detect an ambient temperature relative to the environment to be conditioned and/or heated served by said channel (5),
the thermal optimization procedure further comprising the steps of:
calculating, for each channel (5), a respective environmental differential index representing a difference between:
a. a parameter representative of said delivery temperature and/or return temperature of the carrier fluid of the respective channel (5), and
b. said ambient temperature relative to the environment served by the respective channel (5),
comparing, for each channel (5), said respective environmental differential index with a respective environmental threshold parameter, so that:
a. if said environmental differential index is, in absolute value, lower than said environmental threshold parameter, the process comprises the step of driving the opening of the flow regulator (8) of the respective channel (5).

A 6th aspect is directed to process for controlling a plant (1) for an air conditioning and/or heating plant (1), said plant (1) being of the type comprising:

at least one circuit (2) for distributing a carrier fluid, said at least one circuit (2) comprising:
a. at least one delivery line (3) for the carrier fluid,
b. at least one return line (4) for the carrier fluid, and
at least one central thermal treatment group (6) placed on at least one of said at least one circuit (2), said central thermal treatment group (6) comprising at least one pump (20) operating on said at least one circuit (2) and configured for supplying a hydraulic head to the carrier fluid in order to determine the circulation of the carrier fluid in the circuit (2), said hydraulic head being variable based on variable setting of said pump (20) between a minimum value and a maximum value;
two or more channels (5) each of which is hydraulically interposed between said delivery line (3) and said return line (4), each of said channels (5) defining a respective loop configured for serving respective environments to be air conditioned and/or heated,
for each of said channels (5), the plant (1) also comprising:
a. at least one respective thermal exchange unit (7) operating on each of said channels (5) in order to serve a respective environment to be air conditioned and/or heated,
b. at least one flow regulator (8) operating on each of said channels (5) and configured to regulate a flow of carrier fluid crossing the respective channel (5),
c. a differential pressure detector (9) comprising:
i. an upstream pressure inlet (9a) operatively connected to an upstream section (5a) of the channel (5) located upstream of at least one respective thermal exchange unit (7), for example upstream all thermal exchange units (7), and
ii. a downstream pressure inlet (9b) operatively connected to a downstream section (5b) of the channel (5) located downstream of at least one respective thermal exchange unit (7),
d. said differential pressure detector being configured to detect a control parameter representative of the differential pressure between said upstream section (5a) and said downstream section (5b) of the respective channel (5),
wherein this process includes a pressure optimization procedure comprising the steps of:
detecting, for each channel, said control parameter;
comparing, for each channel (5), said control parameter with a respective threshold control parameter, so that if said control parameter is, in absolute value, greater than said threshold control parameter, the process comprises at least one of the following steps:
a. close the flow regulator (8) of the respective channel (5); and
b. reduce the setting of the pump (20) of the central thermal treatment group (6),
for example where said threshold control parameter is at least one of a predefined value, a value dependent on a plant type (1), a value defined during a plant setting procedure (1).
An aspect 6 bis is directed to a plant for air conditioning and/or heating, said plant (1) being of the type comprising:
at least one circuit (2) for distributing a carrier fluid, said at least one circuit (2) comprising:
a. at least one delivery line (3) of the carrier fluid,
b. at least one return line (4) of the carrier fluid, and
at least one central thermal treatment group (6) placed on at least one of said at least one circuit (2), said central thermal treatment group (6) comprising at least one pump (20) operating on said at least one circuit (2) and configured for supplying a hydraulic head to the carrier fluid in order to determine the circulation of the carrier fluid in said circuit (2), said hydraulic head being variable on a variable setting of said pump (20) between a minimum value and a maximum value;
two or more channels (5) each of which is connected directly or indirectly with said delivery line (3) and with said return line (4), each of said channels (5) defining a respective loop configured to serve respective environments to be conditioned and/or heated,
for each of said channels (5), the plant (1) also comprising:
a. at least one respective thermal exchange unit (7) operating on each of said channels (5) to serve a respective environment to be conditioned and/or heated,
b. at least one flow regulator (8) operating on each of said channels (5) and configured for regulating a flow of carrier fluid through the respective channel (5),
c. a differential pressure detector (9) comprising:
i. an upstream pressure inlet (9a) operatively connected to an upstream section (5a) of the channel (5) located upstream of at least one respective thermal exchange unit (7), for example upstream all thermal exchange units (7), and
ii. a downstream pressure inlet (9b) operatively connected to a downstream section (5b) of the channel (5) located downstream of at least one respective heat exchange unit (7),
d. said differential pressure detector being configured to detect a control parameter representative of the differential pressure between said upstream section (5a) and said downstream section (5b) of the respective channel (5),
at least one control unit (50) operatively connected to said differential pressure detector (9) and to said flow regulator (8) and optionally to said central thermal treatment group (6), said control unit being configured to perform a pressure optimization procedure comprising the steps of:
detecting, for each channel (5), said control parameter;
comparing, for each channel (5), said control parameter with a respective threshold control parameter, so that if said control parameter is, in absolute value, greater than said threshold control parameter, the control unit (50) is configured to perform at least one of the following steps:
a. closing the flow regulator (8) of the respective channel (5); and
b. reducing the setting of the pump (20) of the central thermal treatment group (6),
for example wherein said threshold control parameter is at least one of a predefined value, a value dependent on a plant type (1), a value defined during a plant setting procedure (1).
A further aspect is directed to a plant (1) for air conditioning and/or heating configured for performing the process, for example at least one of the thermal optimization procedure, the hydraulic optimization procedure and the pressure optimization procedure, according to any one of the preceding aspects.
A 7th aspect is directed to a plant (1) for air conditioning and/or heating plant comprising:
at least one circuit (2) for distributing a carrier fluid, said at least one circuit (2) comprising:

a. at least one delivery line (3) for the carrier fluid,
b. at least one return line (4) for the carrier fluid, and
at least one central thermal treatment group (6) located on said at least one circuit (2),
two or more ducts (5) each of which is hydraulically interposed between said delivery line (3) and said return line (4) to serve the respective environments to be conditioned and/or heated,
in which, for each of said channels (5), the plant (1) further comprises:
a. at least one respective heat exchange unit (7) operating on each of said channels (5) to serve a respective environment to be conditioned and/or heated,
b. at least one flow regulator (8) operating on each of said channels (5) and configured for regulating a flow of carrier fluid through at least one respective heat exchange unit (7),
c. at least one ambient temperature detector (30) for each channel (5), said at least one ambient temperature detector (30) being configured for detecting an ambient temperature relative to the environment (5) to be conditioned and/or heated served by said channel (5),
d. at least one temperature detector of the carrier fluid (10) operating on each of said channels (5), said at least one temperature detector of the carrier fluid (10) being configured to detect:
i. a delivery temperature of the carrier fluid in each channel (5), said delivery temperature being measured in an upstream section (5*a*) of the channel (5) which is upstream of all the thermal exchange unit (7) of said channel (5),
ii. a return temperature of the carrier fluid in each channel (5), said return temperature being measured in a downstream section (5*b*) of the channel (5) located downstream of all the thermal exchange unit (7) of said channel (5),
at least one control unit (50) operatively connected to said temperature detector of the carrier fluid (10), to said ambient temperature detector (30), to said flow rate controller (8) and optionally to said central thermal treatment group (6), said control unit (50) being configured for executing a thermal optimization procedure comprising the steps of:
calculating, for each channel (5), a respective environmental differential index representing a difference between:
a. a parameter representative of said delivery and/or return temperature of the carrier fluid of the respective channel (5), and
b. said ambient temperature relative to the environment of the respective channel (5),
calculating, for each channel (5), a respective differential fluid index representative of a difference between the delivery and return temperatures of the carrier fluid;
comparing, for each channel (5), said respective environmental differential index with a respective environmental threshold parameter, so:
a. if said environmental differential index is, in absolute value, lower than said environmental threshold parameter, the process includes the step of driving the opening of the flow regulator (8) of the respective channel (5);
comparing, for each channel (5), said differential fluid index with a respective threshold fluid parameter, so that:
a. if said differential fluid index is, in absolute value, lower than said threshold fluid parameter, the process includes the step of driving the closing the flow regulator (8) of the respective channel (5).

In an 8th aspect according to any one of the preceding aspects, the execution of the step of comparing, for each channel (5), said differential fluid index with the respective threshold fluid parameter, is subject to a condition that said environmental differential index is, in absolute value, greater than or equal to said environmental threshold parameter,
or
wherein the step of closing the flow regulator (8) of the respective channel is subject to a condition wherein:
that environmental differential index is, in absolute value, greater than or equal to that environmental threshold parameter; and
said differential fluid index is, in absolute value, lower than said threshold fluid parameter.

In a 9th aspect according to any one of the preceding aspects, said plant (1) comprises, for each channel (5), at least one control detector (9) operating on the respective channel (5) and configured for detecting at least one value of a control parameter representative of:
a flow rate of the carrier fluid in said respective channel (5), and/or
a differential pressure between said upstream section (5*a*) and said downstream section (5*b*) of the channel (5).

In a 10th aspect according to any one of the preceding aspects, the step of driving the opening and/or closing the flow regulator (8) of each channel comprises the step of opening and/or closing said flow regulator (8) by a predefined amount, for example said predefined amount being determined as a function of at least one target value of said control parameter.

In an 11th aspect according to any one of the preceding aspects, the thermal optimization procedure comprises the steps of:
detecting said at least one value of the control parameter;
defining said at least one target value of the control parameter;
driving the opening or the closing of the flow regulator (8) in a manner such that said at least one detected value of the control parameter is substantially equal to said target value of the control parameter.

In a 12th aspect according to any one of the preceding aspects, the step of defining said at least one target value of the control parameter is executed as a function of at least one value of one between:
the environmental differential index,
the differential fluid index,
the comparison of said environmental differential index with the respective environmental threshold parameter;
the comparison between said differential fluid index and the respective threshold fluid parameter.

In a 13th aspect according to any one of the preceding aspects, the step of defining said at least one target value of the control parameter comprises a step of reducing the target value of the control parameter with the decrease of the value of the differential fluid index.

In a 14th aspect according to any one of the preceding aspects, the step of defining said at least one target value of the control parameter comprises a step of increasing the target value of the control parameter with the decrease of the value of the environmental differential index.

In a 15th aspect according to any one of the preceding aspects, the step of commanding the flow regulator (8) to open or close includes the steps of:
increasing the target value of the control parameter for driving the opening of the flow regulator (8); and reducing the target value of the control parameter for driving the closing of the flow regulator (8), for example wherein:

if the target value of the control parameter is greater than the detected value of the control parameter, the process drives the opening of the flow regulator (8) by said predefined amount, if the target value of the control parameter is lower than the detected value of the control parameter, the process drives the closing of the flow regulator (8) by said predefined amount.

In a 16th aspect according to any one of the preceding aspects, the opening or closing of the flow regulator (8) of one of the channels (5) determines a concomitant variation of the detected value of the control parameter in at least said channel (5) of the circuit (2), optionally wherein the opening or closing of the flow regulator (8) of one or more of the channels (5) determines in all of the remaining channels (5) of the circuit (2) a variation of the respective detected values of the control parameters of said remaining channels (5).

In a 17th aspect according to any one of the preceding aspects, the control detector (9) of each channel is a differential pressure detector comprising:

an upstream pressure inlet (9*a*) operatively connected to the upstream section (5*a*) of the channel (5), and a downstream pressure inlet (9*b*), operatively connected to the downstream section (5*b*) of the channel (5), said control parameter being representative of the differential pressure between said upstream section (5*a*) and said downstream section (5*b*) of the respective channel (5).

In an 18th aspect according to any one of the preceding aspects, the flow regulator (8) is arranged on the downstream section (5*b*) of the channel (5), and wherein the downstream pressure inlet (9*b*) of the control unit (9) is arranged upstream of the flow regulator (8);

or wherein the flow regulator (8) is arranged on the upstream section (5*a*) of the channel (5), and wherein the downstream pressure inlet (9*b*) of the control detector (9) is arranged downstream of the flow regulator (8).

In a 19th aspect according to any one of the preceding aspects, the environmental differential index comprises, for each channel (5), at least one of:

a difference or ratio between the delivery temperature of the carrier fluid and the ambient temperature relative to the channel (5);

a difference or ratio between the return temperature of the carrier fluid and the ambient temperature relative to the channel (5);

a difference or ratio between an average temperature of the carrier fluid and the ambient temperature relative to the channel (5), said average temperature being calculated as the arithmetic mean between the delivery temperature and the return temperature of the carrier fluid.

In a 20th aspect according to any one of the preceding aspects, the differential fluid index comprises an arithmetic difference or ratio between the delivery temperature and the return temperature of the carrier fluid relative to each channel (5).

In a 21st aspect according to any one of the preceding aspects, the environmental threshold parameter is comprised between 8° C. and 55° C., for example between 10° C. and 50° C.

In a 22nd aspect according to any one of the preceding aspects, if the central thermal treatment group (6) comprises a heat generator and wherein preferably the thermal exchange units (7) comprise radiators, the environmental threshold parameter is comprised between 40° C. and 50° C., for example substantially equal to 45° C. optionally ±2° C.

In a 23rd aspect according to any one of the preceding aspects, if the central thermal treatment group (6) comprises a heat pump with heat exchanger, the environmental threshold parameter is between 20° and 30° C., for example 25° optionally ±2° C.

In a 24th aspect according to any one of the preceding aspects, if the central thermal treatment group (6) comprises a cold generation system preferably with fan coil, the environmental threshold parameter is comprised between 10° C. and 15° C., for example 12° C. optionally ±2° C.

In a 25th aspect according to any one of the preceding aspects, the threshold fluid parameter is comprised between 2° C. and 20° C., for example between 3° C. and 15° C. or between 3° C. and 7° C.

In a 26th aspect according to any one of the preceding aspects, if the central thermal treatment group (6) comprises a heat generator, the threshold fluid parameter is comprised between 5° C. and 15° C., for example substantially equal to 10° C. optionally ±2° C.

In a 27th aspect according to any one of the preceding aspects, if the central thermal treatment group (6) comprises a cold generation system, the threshold fluid parameter is comprised between 3° C. and 7° C., for example substantially equal to 5° C. optionally ±2° C.

In a 28th aspect according to any one of the preceding aspects, the process involves performing the thermal optimization procedure iteratively in a loop.

In a 29th aspect according to any one of the preceding aspects, the flow regulator (8) is drivable in a plurality of regulation positions between a maximum closure condition and a maximum open condition of the flow regulator (8), said plurality of regulation positions each defining an opening fraction with respect to said maximum opening.

In a 30th aspect according to any one of the preceding aspects, the central thermal treatment group (6) comprises at least one pump (20) operating on the circuit (2) and configured for supplying a hydraulic head to the carrier fluid in order to determine the circulation of the carrier fluid in the circuit (2), said hydraulic head being variable based on a variable setting of said pump (20) between a minimum value and a maximum value.

In a 31st aspect according to any one of the preceding two aspects, said process includes a hydraulic optimization procedure comprising the steps of:

detecting, for each channel (5), the opening fraction of the flow regulator (8);

comparing, for each channel (5), said opening fraction with a first threshold opening fraction;

if, for at least one channel (5), said opening fraction of the flow regulator (8) is greater than said first threshold opening fraction, increasing the setting of the pump (20), for example wherein said first threshold opening fraction is comprised between 93% and 99%, more optionally between 94% and 96% and in one example substantially equal to 95%.

In a 32nd aspect according to any one of the preceding aspects, the hydraulic optimization procedure further comprises the steps of:

comparing, for each channel (5), said opening fraction of the flow regulator (8) with a second threshold opening fraction, said second threshold opening fraction being lower than said first threshold opening fraction;

if, for all the channels (5), said opening fraction of the flow regulator (8) is lower than said second threshold opening fraction, reducing the setting of the pump (20), wherein said second threshold opening fraction is comprised between 85% and 92%, more particularly between 87% and 91%, for example substantially equal to 90%.

In a 33rd aspect according to any one of the preceding aspects, for each channel, the step of comparing said opening fraction with said first threshold opening fraction precedes the step of comparing said opening fraction of the flow regulator (8) with the second threshold opening fraction, the execution of the step of comparing said opening fraction of the flow regulator (8) with a second threshold opening fraction being subject to the condition wherein said opening fraction of the flow regulator (8) is lower than said first threshold opening fraction.

In a 34th aspect according to any one of the preceding aspects, for each channel (5), the hydraulic optimization procedure is executed following the respective thermal optimization procedure.

In a 35th aspect according to any one of the preceding aspects, for each channel (5), the step of comparing said opening fraction with the first, and optionally with the second, threshold opening fraction is subsequent to the step of comparing said environmental differential index with the respective environmental threshold parameter.

In a 36th aspect according to any one of the preceding aspects, for each channel (5), the step of comparing said opening fraction with the first, and optionally the second, threshold opening fraction is subsequent to the step of comparing said differential fluid index with the respective threshold fluid parameter.

In a 37th aspect according to any one of the preceding aspects, the process involves performing the thermal optimization procedure and the hydraulic optimization procedure sequentially and iteratively in a loop.

In a 38th aspect according to any one of the preceding aspects, the plant comprises a pump motor, for example an electric motor, operatively connected to said pump (20) and configured to drive said pump (20) to provide head to the carrier fluid, said setting of the pump (20) comprising a rotational speed regulation of said pump motor.

In a 39th aspect according to any one of the preceding aspects, the central thermal treatment group (6) comprises at least one pump (20) operating on the circuit (2) and configured for supplying a hydraulic head to the carrier fluid in order to determine the circulation of the carrier fluid in the circuit (2), said hydraulic head being variable based on a setting of said pump (20) variable between a minimum value and maximum value.

In a 40th aspect according to any one of the preceding aspects, said process includes a pressure optimization procedure comprising the steps of:

detecting, for each channel, said control parameter representative of the differential pressure between the upstream (5a) and downstream (5b) sections of the channel (5);

comparing, for each channel (5), said control parameter with a respective threshold control parameter, so that if said control parameter is, in absolute value, greater than said threshold control parameter, the process comprises at least one of the following steps:

a. driving the closure of the flow regulator (8) of the respective channel (5); and b. reducing the setting of the pump (20) of the central thermal treatment group (6), wherein said threshold control parameter is at least one of a predefined value, a value dependent on a type of the plant (1), a value defined during a setting procedure of the plant (1).

In a 41st aspect according to any one of the preceding aspects, the central thermal treatment group (6) comprises at least one thermal unit (11) selected between a heating unit and a cooling unit and configured for delivering a thermal heating or cooling energy, said thermal energy being variable based on a regulation of said thermal unit (11) variable between a minimum value and a maximum value.

In a 42nd aspect according to any one of the preceding aspects, the process includes a central group optimization procedure comprising the steps of:

detecting the setting of said at least one pump (20);

comparing said setting of the pump (20) with a respective first threshold setting;

if said detected setting of the pump (20) is greater than the respective first threshold setting, increasing the regulation of the thermal unit (11), for example wherein said first threshold setting of the pump is comprised between 93% and 99%, more optionally particular between 94% and 97%, and in one example substantially equal to 95%.

In a 43rd aspect according to the preceding aspect, the central group optimization procedure further comprises the steps of:

comparing said setting of the pump (20) with a respective second threshold setting, wherein said second threshold setting is lower than the first threshold setting;

if said detected setting of the pump (20) is lower than the respective second threshold setting, reducing the regulation of the thermal unit (11), for example wherein said second threshold setting is comprised between 85% and 92%, more optionally between 87%% and 91%, and in one example substantially equal to 90%.

In a 44th aspect according to any one of the preceding aspects, the step of comparing said setting of the pump (20) with the respective first threshold setting precedes the step of comparing said setting of the pump (20) with the respective second threshold setting, the execution of the step of comparing said setting of the pump (20) with the respective second threshold setting being subordinate to the condition wherein said detected setting of the pump (20) is lower than the respective first threshold setting.

In a 45th aspect according to any one of the preceding aspects, for each channel (5), the central group optimization procedure is subsequent to the thermal optimization procedure and optionally also subsequent to the hydraulic optimization procedure.

In a 46th aspect according to any one of the preceding aspects, the hydraulic optimization procedure is temporally interposed between the thermal optimization procedure and the central group optimization procedure.

In a 47th aspect according to any one of the preceding aspects, the thermal optimization procedure, the hydraulic optimization procedure and the central group optimization procedure are executed in series with each other in that order.

In a 48th aspect according to any one of the preceding aspects, at the end of the central group optimization procedure, the process newly executes, in a loop, the thermal optimization procedure, the hydraulic optimization procedure and optionally the central group optimization procedure.

In a 49th aspect according to any one of the preceding aspects, the central thermal treatment group (6) comprises at least the heating unit, and wherein the thermal heating energy is proportional to a temperature of the carrier fluid in the delivery line (3) of the circuit (2), for example wherein the process comprises the step of increasing the temperature of the carrier fluid in the delivery line (3) of the circuit (2) to increase the thermal heating energy.

In a 50th aspect according to any one of the preceding aspects, the process involves performing the thermal optimization procedure, the hydraulic optimization procedure and optionally the central group optimization procedure sequentially in that order and iteratively in a loop.

In a 51st aspect according to any one of the preceding aspects, the process executes:
the thermal optimization procedure with a time frequency X;
the hydraulic optimization procedure with a time frequency Y;
the central group optimization procedure with a time frequency Z;
wherein X<Y<Z,
for example wherein:
the time frequency X is comprised between 5 and 20 minutes;
the time frequency Y is comprised between 10 and 40 minutes;
the time frequency Z is comprised between 60 and 240 minutes.

In a 52nd aspect according to any one of the preceding aspects, the thermal optimization procedure, the hydraulic optimization procedure and optionally the central group optimization procedure are executed for each channel (5) of the circuit (2) substantially simultaneously, for example wherein the thermal optimization procedure of a first channel is executed simultaneously with the thermal optimization procedure of a second channel.

A 53rd aspect is directed to a plant (1) for air-conditioning and/or heating comprising:
at least one circuit (2) for distributing a carrier fluid, said at least one circuit (2) comprising:
a. at least one delivery line (3) of the carrier fluid,
b. at least one return line (4) of the carrier fluid, and
at least one central thermal treatment group (6) placed on said at least one circuit (2),
two or more channels (5) each of which is hydraulically interposed between said delivery line (3) and said return line (4) in order to serve respective environments to be air conditioned and/or heated,
wherein, for each of said channels (5), the plant (1) also comprises:
a. at least one respective thermal exchange unit (7) operating on each of said channels (5) in order to serve a respective environment to be air conditioned and/or heated,
b. at least one flow regulator (8) operating on each of said channels (5) and configured for regulating a flow of carrier fluid traversing the at least one respective thermal exchange unit (7),
c. at least one ambient temperature detector (30) for each channel (5), said at least one ambient temperature detector (30) being configured for detecting an ambient temperature relative to the environment (5) to be air conditioned and/or heated served by said channel (5),
d. at least one temperature detector of the carrier fluid (10) operating on each of said channels (5), said at least one temperature detector of the carrier fluid (10) being configured for detecting:
i. a delivery temperature of the carrier fluid in each channel (5), said delivery temperature being detected in an upstream section (5a) of the channel (5) placed upstream with respect to all the thermal exchange units (7) of said channel (5),
ii. a return temperature of the carrier fluid in each channel (5), said return temperature being detected in a downstream section (5b) of the channel (5) placed downstream with respect to all the thermal exchange units (7) of said channel (5),
at least one control unit (50) operatively connected to said temperature detector of the carrier fluid (10), to said ambient temperature detector (30), to said flow regulator (8) and optionally to the central thermal treatment group (6), said control unit (50) being configured for executing a thermal optimization procedure comprising the steps of:
calculating, for each channel (5), a respective environmental differential index representative of a difference between:
a. a parameter representative of said delivery temperature and/or return temperature of the carrier fluid of the respective channel (5), and
b. said ambient temperature relative to the environment of the respective channel (5),
calculating, for each channel (5), a respective differential fluid index representative of a difference between the delivery temperature and return temperature of the carrier fluid;
comparing, for each channel (5), said respective environmental differential index with a respective environmental threshold parameter, so that:
a. if said environmental differential index is, in absolute value, lower than said environmental threshold parameter, the process comprises the step of driving the opening of the flow regulator (8) of the respective channel (5);
comparing, for each channel (5), said differential fluid index with a respective threshold fluid parameter, so that:
a. if said differential fluid index is, in absolute value, lower than said threshold fluid parameter, the process comprises the step of driving the closing of the flow regulator (8) of the respective channel (5).

In a 54th aspect according to any one of the preceding aspects, the flow regulator (8) is drivable into a plurality of regulation positions between a maximum closure condition and a maximum open condition of the flow regulator (8), said plurality of regulation positions each defining an opening fraction with respect to said maximum opening.

In a 55th aspect according to any one of the preceding aspects, the central thermal treatment group (6) comprises at least one pump (20) operating on the circuit (2) and configured for supplying a hydraulic head to the carrier fluid in order to determine the circulation of the carrier fluid in the circuit (2), said hydraulic head being variable based on a setting of said pump (20) variable between a minimum value and maximum value.

In a 56th aspect according to any one of the preceding aspects, the control unit (50) is further configured for executing a hydraulic optimization procedure comprising the steps of:

detecting, for each channel (5), the opening fraction of the flow regulator (8);
comparing, for each channel (5), said opening fraction with a first threshold opening fraction;
if, for at least one channel (5), said opening fraction of the flow regulator (8) is higher than said first threshold opening fraction, increasing the setting of the pump (20),
for example wherein said first threshold opening fraction is comprised between 93% and 99%, more optionally between 94% and 96%, and in one example substantially equal to 95%.

In a 57th aspect according to any one of the preceding aspects, the central thermal treatment group (6) comprises at least one thermal unit (11) selected from a heating unit and a cooling unit and configured for delivering a thermal heating or cooling energy, said thermal energy being variable based on a regulation of said thermal unit (11) variable between a minimum value and a maximum value, and wherein the control unit (50) is configured for executing a central group optimization procedure comprising the steps of:
detecting the setting of said at least one pump (20);
comparing said setting of the pump (20) with a respective first threshold setting;
if said detected setting of the pump (20) is higher than the respective first threshold setting, increasing the regulation of the thermal unit (11),
wherein said first threshold setting of the pump is comprised between 93% and 99%, more particularly between 94% and 97%, for example substantially equal to 95%.

In a 58th aspect according to any one of the preceding aspects, each channel (5) comprises two or more thermal exchange units (7), for example wherein each channel (5) comprises three or more thermal exchange units (7).

In a 59th aspect according to any one of the preceding aspects, the at least one heat exchange unit (7) for each channel (5) comprises:
a local temperature detector (15) configured to detect a local temperature in an environment adjacent to said heat exchange unit (7), and
a local flow regulator (14) configured for varying a flow rate of carrier fluid, deriving from the respective channel (5), entering said heat exchange unit (7) as a function of said local temperature,
said local flow controller (14) being configured for reducing or stopping the flow of carrier fluid in said heat exchange unit (7) upon reaching a condition so that the local temperature detected by the local temperature detector (15) is equal to or greater than a respective target local temperature,
optionally wherein each heat exchange unit (7) of each channel comprises said local temperature detector and said flow controller,
for example wherein said local temperature detector and said local flow rate controller define a single body; said single body may be a thermostatic valve.

In a 60th aspect according to any one of the preceding aspects, each heat exchange unit (7) comprises an inlet plug and an outlet plug for respectively allowing the input and the output of the carrier fluid from said heat exchange unit (7), said inlet plug and said outlet plug being hydraulically connected to the respective channel (5) in parallel or in series, for example wherein a channel of said two or more channels (5) comprises a first heat exchange unit (7) connected in parallel to said channel, and a second heat exchange unit (7) connected in series to said channel (5).

In a 61st aspect according to any one of the preceding aspects, each channel (5) comprises one and only one flow regulator (8).

In a 62nd aspect according to any one of the preceding aspects, each channel (5) comprises one and only one ambient temperature detector (30), for example each channel (5) defining a respective environment distinct from a further environment served by a further channel (5).

In a 63rd aspect according to any one of the preceding aspects, the central thermal treatment group (6) comprises at least one pump (20) operating on the circuit (2) and configured for supplying a hydraulic head to the carrier fluid in order to determine the circulation of the carrier fluid in the circuit (2), said hydraulic head being variable based on a variable setting of said pump (20) between a minimum value and a maximum value, and wherein the control unit (50) is configured for executing a pressure optimization procedure comprising the steps of:
detecting, for each channel, said control parameter;
comparing, for each channel (5), said control parameter with a respective threshold control parameter, so that if said control parameter is, in absolute value, greater than said threshold control parameter, the control unit (50) is configured for executing at least one of the following steps:
a. driving the closing the flow regulator (8) of the respective channel (5); and
b. reducing the setting of the pump (20) of the central thermal treatment group (6),
wherein said threshold control parameter is at least one of a predefined value, a value dependent on a type of the plant (1), a value defined during a setting procedure of the plant (1).

In a 64th aspect according to any one of the preceding aspects, said control unit (50) of the plant for air for conditioning and/or heating is configured for executing the thermal optimization procedure in a loop, said thermal optimization procedure optionally being according to any one of the preceding aspects.

In a 65th aspect according to any one of the preceding aspects, said control unit (50) of the plant for air conditioning and/or heating is configured for executing the hydraulic optimization procedure in a loop, said hydraulic optimization procedure optionally being according to any one of the preceding aspects.

In a 66th aspect according to any one of the preceding aspects, said control unit (50) of the plant for air conditioning and/or heating is configured for executing the central group optimization procedure in a loop, said central group optimization procedure optionally being according to any one of the preceding aspects.

In a 67th aspect according to any one of the preceding aspects, said control unit (50) of the plant for air conditioning and/or heating is configured for executing said thermal optimization procedure, said hydraulic optimization procedure and said central group optimization procedure sequentially in said order and in a loop, wherein said thermal optimization procedure, said hydraulic optimization procedure and said central group optimization procedure being optionally according to any one of the preceding aspects.

BRIEF DESCRIPTION OF THE DRAWINGS

Embodiments and aspects of the invention will be described below with reference to the accompanying figures, which are provided for illustrative purposes only and are therefore not limitative.

DEFINITIONS AND MATERIALS

Figure 1:
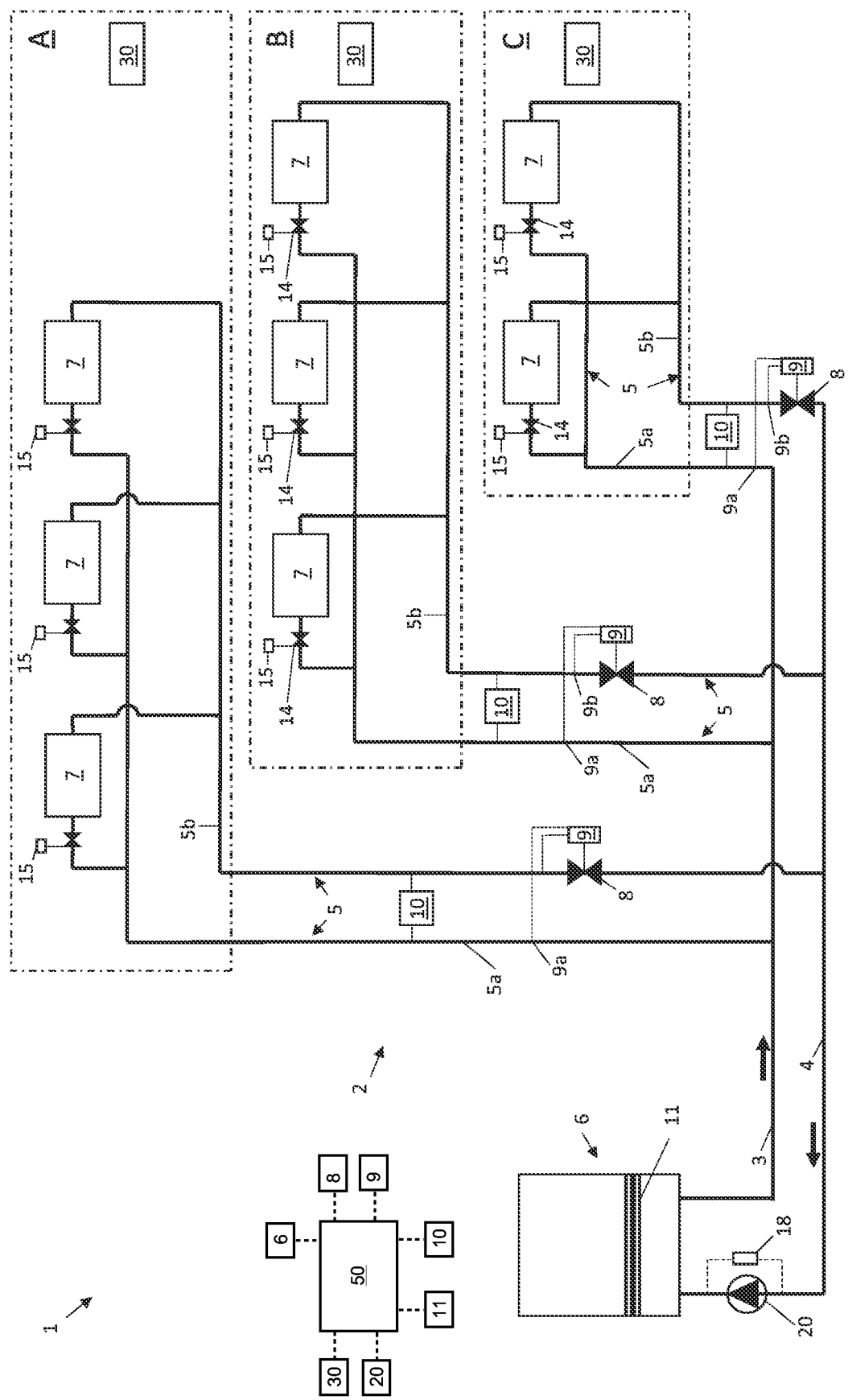
FIG. 1 is a schematic representation of a plant for air conditioning and/or heating according to the present invention.

The figures show the object of the invention by means of non-scaled representations; therefore, parts and components shown in the figures relating to the object of the invention may relate only to schematic representations.

The term carrier fluid or thermocarrier is understood to mean a substance in a liquid or gaseous state suitable for receiving, storing, transporting and releasing heat. For example, water, for example hot water, or mixtures of hot water and glycol can be used as a carrier fluid in a heating plant.

In a plant for air-conditioning, natural refrigerants (e.g. ammonia and carbon dioxide) or artificial refrigerants, cold water or mixtures of water and glycol or other antifreeze substances can be used as the carrier fluid.

The term central heat treatment unit (identified by reference number 6) is meant a unit comprising a heating unit 11 (e.g. a boiler unit, or a heat pump, or a solar panel plant or other heating device) configured for heating a liquid and delivering hot liquid to appropriate heat treatment units or consumers using heat for treating an environment. The central heat treatment unit may further or alternatively comprise a refrigeration unit (also denoted with 11) configured for treating (cooling) a thermocarrier fluid and for delivering it to appropriate heat treatment units such as, for example, indoor air conditioning units. The central heat treatment unit further comprises at least one pump identified with the reference number 20.

Control Unit 50

The plant of the present invention may comprise at least one control unit 50 for controlling operating conditions and/or for controlling process steps.

The control unit may be a single unit or may be formed by a plurality of distinct control units depending on the design choices and operational requirements.

N.B.: 'Circuit element' is a single active or passive functional part of an electronic circuit, such as one diode, one transistor, one resistor, one capacitor, etc. The term 'control unit' means an electronic component which may comprise at least one of: a digital processor (CPU), an analogue circuit, or a combination of one or more digital processors with one or more analogue circuits. The control unit may be "configured" or "programmed" to perform certain steps: this may be accomplished in practice by any means that allows the control unit to be configured or programmed. For example, in the case of a control unit comprising one or more CPUs and one or more memories, one or more programs may be stored in appropriate memory banks connected to the CPU(s); the program(s) contain instructions which, when executed by the CPU(s), program or configure the control unit to perform the operations described in relation to the control unit. Alternatively, if the control unit is or includes analogue type circuitry, then the circuitry of the control unit may be designed to include circuitry configured, in use, to process electrical signals such as to perform the steps related to the control unit.

Actuator

The term actuator refers to any device suitable for causing a movement on a body, e.g. in response to a command given by the control unit 50. The actuator may be electric, pneumatic, mechanical (e.g. spring), hydraulic or other types.

DETAILED DESCRIPTION

Plant 1 for Air Conditioning and/or Heating

With reference to the above figures, with 1 has been generally indicated a plant for air-conditioning and/or heating, for example which can be used in both civil and industrial environments and which can advantageously be used, without limitation, for controlling and optimizing hydronic plants.

As can be seen for example from FIG. 1, the plant 1 comprises a circuit 2 for distributing a carrier fluid. The circuit 2 comprises at least two main channels, namely a delivery line 3, for sending the carrier fluid to a predetermined number of users or thermal exchange units 7, and a return line 4 in fluid connection with the delivery line 3 and suitable for receiving the carrier fluid downstream of each of the units 7. The thermal exchange units 7 may comprise heaters, for example radiators, or convectors or other types of exchangers suitable for exchanging thermal energy, heating or cooling, of the carrier fluid with the surrounding environment.

The plant 1 may further comprise a control unit 50 operatively connected to one or more components of the plant as described in detail below.

As shown in FIG. 1, the plant 1 includes at least one central thermal treatment group 6 placed on the circuit 2 between the delivery line 3 and the return line 4 and configured for varying at least one between the temperature and the flow rate of the carrier fluid in the delivery line 3. For example, the central group 6 includes at least one pump 20, for example a volumetric pump or centrifugal pump, configured for supplying a hydraulic head to the carrier fluid and determine its circulation in the circuit 2. The plant comprises a pump motor, for example an electric motor, operatively connected to the pump 20 and configured to drive the pump 20 for supplying a hydraulic head to the carrier fluid and determine its circulation in the circuit 2: said hydraulic head being variable based on a setting of said pump 20 variable between a minimum value and maximum value. An adjustment of a rotation speed of the pump motor determines the setting of the pump 20 and consequently the hydraulic head supplied to the carrier fluid. The control unit 50 may be operatively connected to the central heat treatment group 6 for driving the activation, stopping and setting of the pump 20.

The central group 6 further comprises at least one thermal unit 11, for example a cooling and/or heating unit, configured for respectively cooling or heating the carrier fluid to be sent to the thermal exchange units 7. The heating thermal unit 11 may be a combustion boiler wherein the fuel may be natural gas, for example methane gas, liquefied LPG gas, paraffin, diesel fuel, wood material. Alternatively, the heating thermal unit may be an electrically powered heat pump or may comprise an electrical resistance configured to heat up as a result of a current flow. The thermal cooling unit may also comprise an electrically powered heat pump.

The thermal unit 11 is configured for supplying to the carrier fluid a variable thermal energy on the basis of a regulation of the thermal unit 11 itself, wherein said regulation is variable between a minimum and a maximum value. Such regulation may result in a variation of a flame suitable for heating the carrier fluid. For example, in the case of a heating thermal unit 11, an increase in said regulation of the thermal unit 11 may determine an increase in the temperature of the carrier fluid. Conversely, in the case of a cooling thermal unit 11, an increase in such regulation of the thermal unit 11 may result in a reduction in the temperature of the carrier fluid. In other words, an increase in the thermal heating energy exchanged by the thermal unit 11 with the carrier fluid allows for greater heating of the environment to be heated. Similarly, an increase in the thermal cooling energy exchanged by the thermal unit 11 with the carrier fluid allows for greater cooling of the environment to be conditioned. The control unit 50 may be operatively connected to the central thermal treatment group 6 for driving the activation, stopping and regulation of the thermal unit 11.

The thermal treatment group 6 is interposed in a circuit between the delivery line 3 and the return line 4, so as to supply the delivery line and receive the carrier fluid from the return line 4. In FIG. 1, a configuration of the plant 1 is schematically shown with only one central thermal treatment group 6: it is however possible to provide for a plurality of groups 6 arranged in series or parallel (configurations not illustrated in the accompanying figures).

The/each heat treatment group 6 may further comprise a differential pressure detector 18 connected astride the pump 20, wherein the differential pressure detector 18 comprises a downstream pressure inlet connected at the outlet of the pump 20, and an upstream pressure inlet connected at the inlet of the pump 20. The differential pressure detector 18 is thus configured for detecting a pressure jump between an upstream section and a downstream section of the pump 20: such pressure jump may be indicative of a hydraulic head supplied by the pump 20 to the carrier fluid, so as to detect the actual head supplied to the carrier fluid. The differential pressure detector 18 may also be used for providing an alarm signal or for automatically executing a corrective action as a function of the detected pressure jump: for example, a pressure jump exceeding a predetermined threshold may be indicative of a problem with circuit 2 or pump 20. Similarly, a pressure jump exceeding a predetermined threshold and inconsistent with a current speed of the pump may be indicative of a problem with circuit 2 or pump 20. Alternatively or in addition to the differential pressure detector 18, the/each heat treatment group 6 may comprise a flowmeter configured for detecting a flow rate of the carrier fluid: for example, such a flowmeter may be installed on the delivery line 3 or the return line 4 of the circuit 2. The control unit 50 may be operatively connected to the differential pressure detector 18 and configured for receiving as input a signal representative of the differential pressure between the upstream and downstream sections of the pump 20: the control unit may also be configured for calculating a value relative to said pressure jump.

As can be seen from FIG. 1, the distribution circuit 2 includes a series of circulation channels or distribution branches (hereinafter simply referred to as channels) 5 connected directly or indirectly with the delivery line 3 and with the return line 4 and configured for serving respective environments to be conditioned and/or heated by means of a predetermined number of thermal exchange units 7, for example one channel for each user, as described in detail below.

For example, the circuit 1 may comprise two, three, four or more channels 5 each of which is hydraulically interposed between the delivery line 3 and the return line 4 of the circuit 2 for serving respective environments to be conditioned and/or heated. FIG. 1 shows a configuration currently considered preferable, but not limiting, of the invention in which each channel 5 is hydraulically interposed between the delivery line 3 and the return line 4 and serves two or three or more respective thermal exchange units 7: in such configuration, the channels 5 are arranged in parallel with each other and receive fluid from the delivery line and then return it to the return line after the fluid has passed from the respective units 7; in this configuration, only one type of fluid can be sent to each unit 7: for example, if the central unit 6 includes a heating unit 11 (or cooling unit) each of the channels 5 receives heated (or respectively cooled) fluid from the central group 6 and discharges fluid on the return line that has cooled (or respectively heated) following the passage through the respective units 7. The connection configuration in parallel also allows the carrier fluid to flow within the circuit 2 through all the channels 5 simultaneously, or to flow through only some of the channels 5 of the plant 1.

Each channel 5 is associated with a respective environment to be conditioned and/or heated: said environments are schematically represented in FIG. 1 as environments A, B and C. Each environment A, B and C may be an internal environment of a building, for example a single room of a house, or it may represent the combination of several rooms arranged, for example, on the same floor.

In this regard, the plant comprises, for each channel 5, a respective ambient temperature detector 30 configured for detecting an environmental temperature relative to the environment A, B, C served by the respective channel 5. The temperature detector 30 may be an electronic thermometer or temperature probe configured to output a signal representative of the ambient temperature. The temperature detector 30 may be wired or wirelessly connected to the control unit 50: the control unit is then configured for receiving the signal representative of the ambient temperature and calculating a respective value of the ambient temperature.

As briefly mentioned above, the circuit 2 includes a plurality of channels 5: for each channel 5, the plant 1 includes at least one heat exchange unit 7 configured for serving the respective environment to be conditioned and/or heated. For example, each channel may comprise a single heat exchange unit 7, or two, three or more thermal exchange units 7. Each heat exchange unit 7 (utility) may comprise at least one of:
- a fan coil unit with at least one fan as heat exchange modulator;
- an AHU (air handling unit) with at least one fan as heat exchange modulator;
- a radiator and/or thermal convector as a heat exchange modulator;
- a heat exchanger, possibly with an adjustable heat exchange surface, as a heat exchange modulator.

Each channel 5 thus includes an upstream section 5a placed upstream with respect to all the thermal exchange units 7 of this channel, and a downstream section 5b placed downstream with respect to all the thermal exchange units 7 of the same channel. The upstream section 5a of a channel 5 is hydraulically interposed between the delivery line 3 of the circuit 2 and the first heat exchange unit 7 placed on this channel 5: similarly, the downstream section 5b of this channel 5 is hydraulically interposed between the last heat exchange unit 7 placed on this channel 5 and the return line 4 of the circuit 2. In greater detail, the downstream section 5b of a channel 5 is hydraulically interposed between the return line 4 of the circuit 2 and a connection branch to any of the thermal exchange units 7 of said channel 5.

Each heat exchange unit 7 includes an inlet branch and an outlet branch hydraulically connected to the same channel 5 and configured for allowing respectively the inlet and the outlet of the carrier fluid from the heat exchange unit 7. In the event that the channel 5 comprises two or more thermal exchange units 7, the heat exchange units may be connected in parallel or in series to the channel 5. For example, as shown in the embodiment of FIG. 1, a channel 5 may comprise a first heat exchange unit 7 connected in parallel to said channel 5, and a second heat exchange unit 7 connected in series to said channel 5. In a preferred embodiment, each channel 5 comprises at most a single heat exchange unit 7 connected in series to said channel 5. For example, in the case where a channel 5 comprises "n" thermal exchange units 7 with n>2, n−1 thermal exchange units 7 are connected to the channel 5 in parallel with each other or in parallel with the channel itself, and a single heat exchange unit 7 is connected in series to the channel 5.

The thermal exchange units 7 of the circuit 2 may further cooperate with a local flow rate regulator 14 configured for varying a flow rate of carrier fluid, resulting from the respective channel 5, for example, entering the heat exchange unit 7. For example, the local flow rate regulator 14 may be arranged on the inlet branch or the outlet branch of the respective heat exchange unit 7.

The local flow regulator 14 may be a manual type valve or an automatic type valve. The manual type local flow rate regulator 14 includes a knob operable by a user subject and configured for varying a valve passage opening, so as to manually regulate a flow rate of carrier fluid to the respective heat exchange unit 7. Alternatively, the automatic-type local flow rate regulator 14 further comprises a local temperature detector 15 configured for detecting a local temperature in an environment adjacent to the heat exchange unit 7: the automatic-type local flow rate regulator 14 is then configured for reducing or interrupting the flow rate of carrier fluid to said heat exchange unit 7 upon reaching a condition so that the local temperature detected by the local temperature detector 15 is substantially equal to or greater than a respective target local temperature (regulator or thermostatic valve). The local target temperature may be set manually by the user subject, for example by manually acting on a knob: alternatively, the local target temperature may be set electronically via a graphical interface or remotely.

In a currently preferred embodiment, the local temperature detector 15 and the local flow rate regulator 14 define a single body, for example the single body may define a thermostatic valve. Note that the local ambient temperature detected by the local temperature detector 15 of a heat exchange unit 7 served by a channel 5 may differ from the environmental temperature detected by the ambient temperature detector 30 relating to the same channel 5. For example, the ambient temperature detected by the ambient temperature detector 30 may be an average temperature of the local ambient temperatures measured by the ambient temperature detectors 15 of the thermal exchange units 7 of the same channel 5.

In the circuit of FIG. 1, an embodiment wherein all thermal exchange units 7 comprise a local flow rate regulator 14 and a respective local temperature detector 15 is shown. However, the circuit may comprise thermal exchange units 7 wherein the local flow rate regulator 14, and the respective local temperature detector 15, are absent. Optionally, the circuit 2 may not comprise local flow rate regulators 14 and respective local temperature detectors 15.

The circuit 2 may further comprise, for each channel 5, at least one temperature detector of the carrier fluid 10 operating on each of said channels 5. The temperature detector of the carrier fluid 10 is configured for detecting a delivery temperature of the carrier fluid in each channel 5 detected in the upstream section 5a of the channel 5 placed upstream with respect to all thermal exchange units 7 of the channel 5. The temperature detector of the carrier fluid 10 is further configured for detecting a return temperature of the carrier fluid in each channel 5 detected in the downstream section 5b of the channel 5 located downstream with respect to all the thermal exchange units 7 of said channel 5. For example, the temperature detector of the carrier fluid 10 comprises an upstream plug, connected to the upstream section 5a of the channel 5, and a downstream plug connected to the downstream section 5b of the same channel 5, as shown schematically in FIG. 1. In an embodiment, the temperature detector 10 of each channel 5 is in one body and having the temperature plugs connected to the upstream and downstream sections 5a, 5b of the respective channel 5. Alternatively, the temperature detector 10 comprises, for each channel, a first upstream temperature detector connected to the upstream section 5a and configured for detecting the temperature of the carrier fluid in the upstream section 5a, and a second downstream temperature detector connected to the downstream section 5b and configured for detecting the temperature of the carrier fluid in the downstream section 5b of the respective channel 5.

The plant 1 further comprises, for each of the channels 5, at least one flow regulator 8 configured for varying the amount of carrier fluid (mass flow rate or volumetric flow rate) passing through the respective channel 5. In greater detail, the flow regulator 8 may comprise a valve having a valve body having at least one inlet, one outlet and a passage that places the inlet in fluid communication with the outlet. The valve body has, at the inlet and the outlet of the valve, respective connecting members suitable for allowing the valve to be fixed to the circuit. The connecting members may be, for example, threads or quick couplings or other connections.

The passage also has a seat suitable for housing an intercepting element which has the task of partially or totally intercepting the fluid flowing through the valve and is therefore able for acting as a flow regulator or as a closing element of the passage. The intercepting element, in cooperation with the valve body, defines a fluid section size of variable width according to positions taken by the intercepting element relative to the valve body.

The flow regulator 8 comprises an actuator member connected to the valve body and active on the intercepting element for moving the latter at least between a fully open position, wherein the section size has maximum area, to a closed position, wherein the section size is closed. In greater detail, the actuating member may comprise an electric motor carried by the valve body and engaged with the intercepting element.

The flow regulator 8 may further comprise at least one position sensor configured for determining the positions taken by the intercepting element, along a predetermined operating stroke relative to the valve body, and to transmit a respective signal. In a non-limiting embodiment of the invention, the intercepting element is configured for taking a plurality of positions along said operating stroke each corresponding to a fraction of an opening of said section size with respect to the maximum opening: the position sensor may for example comprise an encoder, a potentiometer, or other configured for emit a signal for allowing the determination the position of the intercepting element along the operating stroke: for example, the position sensor may be configured for emitting a signal at each step of predetermined entity made by the intercepting element along the operative stroke, or for emitting a linked amplitude or frequency signal which is a function of the position of the intercepting element along the operating stroke.

In a non-limiting embodiment of the invention, the plant comprises a control unit 50 connected to the position sensor and active on the actuating member of the flow regulator 8. The control unit 50 is configured for receiving a signal from the position sensor, and process said signal to determine the relative position of the intercepting element with respect to the valve body to determine the opening fraction of the flow regulator 8. The control unit 50 may further be configured for driving the actuator of the flow regulator 8 to move the intercepting element in a controlled manner between a maximum closed condition and a maximum open condition.

The plant may further comprise, for each channel 5, at least one control detector 9 operating on the respective channel 5 and configured for detecting a value of a control parameter relative to the carrier fluid circulating in said channel 5. For example, the control detector 9 may comprise a differential pressure detector comprising an upstream pressure inlet 9a operatively connected to the upstream section 5a of said channel 5, and a downstream pressure inlet 9b operatively connected to the downstream section 5b of said channel 5, as shown schematically in FIG. 1: the control detector 9 is thus configured to detect a differential pressure between the upstream section 5a and the downstream section 5b of said channel 5.

Alternatively, the control detector 9 may comprise a flowmeter configured for detecting a flow rate of the carrier fluid in the respective channel 5.

The control detector 9 may further be operatively connected to the control unit 50, wherein the latter is configured for receiving as input the signals emitted by the control detector 9 and calculate a differential pressure value or a fluid flow rate. Optionally, the control unit 50 may be configured for estimating a flow rate of fluid carrier through the channel 5 as a function of a differential pressure value detected between the upstream section 5a and the downstream section 5b of the channel 5. For example, the control unit 50 may be configured for driving in opening and/or closing the flow regulator 8, for example by means of the actuating member of the flow regulator 8, as a function of a differential pressure value detected by the control detector 9 between the upstream section 5a and the downstream section 5b of the channel 5, or according to a value of flow rate of carrier fluid detected by the control detector 9 in the channel 5. The control logic of the flow controller 8 is described in detail below in the description of the control process.

In an embodiment shown in FIG. 1, the flow regulator 8 is arranged on the downstream section 5b of the channel 5, and wherein the downstream pressure inlet 9b of the control detector 9 is arranged upstream of the flow regulator 8. Alternatively, the flow rate regulator 8 may be placed on the upstream section 5a of the channel 5: in such configuration, the downstream pressure inlet 9b of the control detector 9 is always arranged on the downstream section 5b of the channel 5, and thus the downstream pressure inlet 9b is placed downstream of the flow rate regulator 8. The upstream pressure inlet 9a of the control detector 9 is arranged downstream of the flow rate regulator 8 when the latter is located on the upstream section 5a of the channel 5.

In an embodiment, the control detector 9 may further include the previously described carrier fluid temperature detector 10. For example, the control detector 9, configured for detecting a differential pressure between the upstream section 5a and the downstream section 5b of each channel 5, and the carrier fluid temperature detector 10, configured for detecting a delivery temperature of the carrier fluid in the upstream section 5a and the downstream section 5b of each channel 5, may define a single body. For example, the upstream and downstream pressure inlets 9a, 9b of the control detector 9 may coincide with an upstream temperature plug and a downstream temperature plug of the temperature detector 10, respectively.

In a further embodiment, the flow regulator 8 and the control detector 9 may define a single body, for example a control valve configured for varying the amount of fluid carrier (mass flow rate or volumetric flow rate) passing through the respective channel 5 and for detecting at least one of a fluid flow rate, and the differential pressure between the upstream and downstream sections 5a, 5b of the respective channel.

Additionally, the flow regulator 8, the control detector 9 and the temperature detector of the carrier fluid 10 can define a single body.

Control Process 1000

The control process 1000 may be performed on the plant 1 described above. The steps of the process 1000 described below may be performed by the control unit 50 of the plant 1. The control unit 50 may be configured for driving the central thermal treatment group 6 (for example the pump 20 and the thermal unit 11), the flow controllers 8 of each channel 5, and for detecting the ambient temperature relative to each channel 5 by means of the ambient temperature detector 30. Moreover, the control unit 50 may be configured for detecting the upstream and downstream temperature in each channel 5 by means of the carrier fluid temperature detector 10, and for detecting the control parameter by means of the control detector 9.

Figure 2:
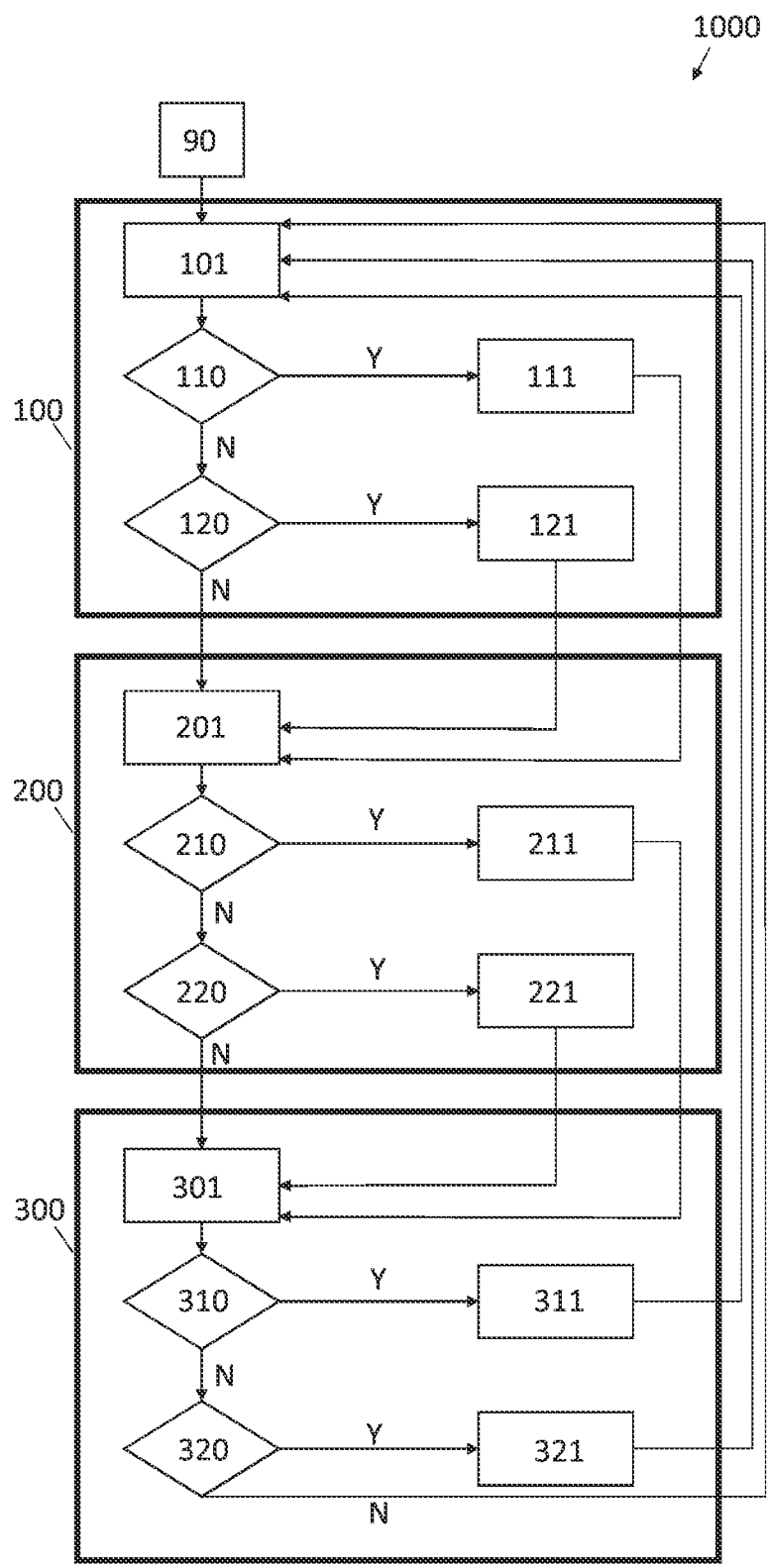
FIG. 2 is a flow chart comprising process steps according to an embodiment of the present invention.

The process 1000, shown schematically in a non-limiting manner in the flowchart of FIG. 2, is directed to the control of the air conditioning or heating plant 1 and includes a thermal optimization procedure 100, comprising the steps of:

calculating, for each channel 5, a respective environmental differential index representing a difference between:
a. a parameter representative of said delivery temperature and/or return temperature of the carrier fluid of the respective channel 5, and
b. the ambient temperature relative to the environment served by the respective channel 5.

The parameter representing the flow and/or return temperature of the carrier fluid may be the delivery temperature of the carrier fluid, or the return temperature of the carrier fluid, or an arithmetic average between the delivery temperature and the return temperature of the carrier fluid.

The delivery temperature and the return temperature are detected by means of the temperature detector of the carrier fluid 10 at the upstream section 5a and the downstream section 5b respectively of each channel 5. The ambient temperature relative to the environment served by the respective channel 5 is instead detected by the ambient temperature detector 30 arranged in that environment.

Thus, the environmental differential index may comprise, for each channel 5, a difference or ratio between the delivery temperature of the carrier fluid and the ambient temperature relative to the channel 5. Alternatively, the environmental differential index may comprise, for each channel 5, a difference or ratio between the return temperature of the carrier fluid and the ambient temperature relative to the channel 5. Alternatively, the environmental differential index may comprise, for each channel 5, a difference or ratio between the average temperature of the carrier fluid and the ambient temperature relative to the channel 5. In detail, such difference is a difference in absolute value. The differential index may also be calculated as a known function, for example a linear function, of the above difference or ratio.

For example, for each channel 5, the environmental differential index $I_{da}$ may be calculated as expressed by the following formula, where T1 is the delivery temperature, T2 is the return temperature of the carrier fluid, and $T_{amb}$ is the ambient temperature relative to channel 5:

$$I_{da} = \left| \frac{T1 + T2}{2} - T_{amb} \right|$$

The thermal optimization procedure 100 further comprises the step 110 of comparing, for each channel 5, the respective environmental differential index with a respective environmental threshold parameter A1, so that if the environmental differential index is, in absolute value, lower than the environmental threshold parameter, the process comprises the step 111 of driving the opening of the flow rate controller 8 of the respective channel 5. The environmental threshold parameter A1 depends at least on the type of heating or cooling generator and on the type of exchangers used. For example, in the case of a heat generator and the use of radiators, A1 can be expected to be comprised between 40° C. and 50° C., for example substantially equal to 45° C., optionally ±2° C. In the case of a heat pump with heat exchanger the parameter A1 can be comprised between 20° C. and 30° C., for example 25°±2° C. In the case of a cooling generation plant with fan coil the A1 parameter can be comprised between 10° and 15° C., for example 12°±2° C. The condition 110 for driving the opening the flow rate regulator 8 of the respective channel 5 can be expressed by the following formula:

$$I_{da} = \left| \frac{T1 + T2}{2} - T_{amb} \right| < A1 \qquad (110)$$

The thermal optimization procedure 100 further comprises the step of calculating, for each channel 5, a respective differential fluid index $I_{df}$ representative of a difference between the delivery and return temperature of the carrier fluid. For example, the differential fluid index may comprise, for each channel 5, an arithmetic difference or a ratio between the delivery temperature and the return temperature of the carrier fluid (also in this case it could alternatively be expected that the differential fluid index $I_{df}$ is calculated as a known function of the ratio or difference just mentioned), as expressed below in a formula:

$$I_{df} = |T1 - T2|$$

The thermal optimization procedure further comprises the step 120 of comparing, for each channel 5, the differential fluid index $I_{df}$ with a respective threshold fluid parameter A2, whereby if the differential fluid index is, in absolute value, lower than the threshold fluid parameter, the process comprises the step 121 of driving the closure of the flow controller 8 of the respective channel 5. The threshold fluid parameter in the case of heating units is, for example, comprised between 5° C. and 15° C., optionally substantially equal to 10° C. optionally ±2° C. In case of cooling units the threshold fluid parameter A2 is for example comprised between 3° C. and 7° C., and for instance substantially equal to 5° C. optionally ±2° C. The condition 120 for driving the closure the flow rate controller 8 of the respective channel 5 can be expressed as follows:

$$I_{df} = |T1 - T2| < A2 \qquad (120)$$

According to the flow chart in FIG. 2, the occurrence of the condition set, e.g. conditions 110 and 120, is highlighted with the symbol "Y" (yes): on the contrary, if the condition is not verified, the path in the flow chart is indicated with "N" (no).

The thermal optimization procedure further provides that the execution of the step 120 of comparing, for each channel 5, the differential fluid index with the respective threshold fluid parameter, is subject to a condition wherein the environmental differential index is, in absolute value, greater than or equal to said environmental threshold parameter. In other words, if the condition 110 is not verified ("N"), then the thermal optimization procedure performs the step 120.

In a similar embodiment, the thermal optimization procedure involves the execution of the step 121 of driving the closure the flow rate controller 8 of the respective channel 5 only if the environmental differential index is, in absolute value, greater than or equal to the environmental threshold parameter, and if the differential fluid index is, in absolute value, lower than the threshold fluid parameter. In other words, the step 121 is executed only if the condition 110 is not verified ("N") and if the condition 120 is verified ("Y").

It should also be noted that the thermal optimization procedure includes an initial phase 101 of detecting parameters such as the delivery and return temperatures of the carrier fluid, and the ambient temperature associated with each channel.

The step of driving the opening and/or closure the flow rate controller 8 of each channel comprises in turn the step of opening and/or closing the flow rate controller 8 by a predefined amount: said predefined amount may be determined depending on at least one target value of the control parameter detected by the respective control detector 9. For example, the thermal optimization procedure comprises the steps of detecting the value of the control parameter, defining an target value of the control parameter, and driving the opening or closure of the flow rate controller 8 such that the detected value of the control parameter is substantially equal to the target value of the control parameter. In this case, the control parameter may be the differential pressure value between the upstream section 5a and the downstream section 5b, or the flow rate value in the channel 5. Similarly, the target value of the control parameter may be a differential pressure target value between the upstream section 5a and the downstream section 5b, or a flow rate target value in the channel 5.

The step of defining the target value of the control parameter may be executed as a function of the value of the environmental differential index, the differential fluid index, or as a function of the comparison between the environmental differential index and the respective environmental threshold parameter, or the comparison between the differential fluid index and the respective threshold fluid parameter. For example, the thermal optimization procedure may comprise varying, e.g. increasing or reducing, the target value of the control parameter by an amount proportional to (or known function of) the differential fluid index and/or the environmental differential index. It should be noted that the thermal optimization procedure involves increasing the target value of the control parameter as the value of the environmental differential index decreases. This is due to the fact that the condition wherein the environmental differential index is low, for example lower than the respective environmental threshold parameter, represents a situation of insufficient heat exchange between the thermal exchange units 7 and the surrounding environment: to overcome this, the procedure involves increasing the target value of the control parameter, for example the pressure differential between upstream and downstream of the thermal exchange units 7. A greater pressure differential corresponds to a greater flow rate of carrier fluid, and therefore to a greater thermal power exchanged by the thermal exchange units 7 with the environment to be heated or conditioned.

In contrast, the thermal optimization procedure involves reducing the target value of the control parameter as the value of the differential fluid index decreases. This is due to the fact that the condition wherein the differential fluid index is low, for example lower than the respective threshold fluid parameter, represents a situation where the carrier fluid does not have the necessary time to exchange heat with the environment, resulting in an excessively low temperature variation between upstream and downstream. To overcome this, the procedure involves reducing the target value of the control parameter, for example reducing the target value of differential pressure between upstream and downstream of the thermal exchange units 7 of a channel 5. A lower pressure differential corresponds to a lower flow rate of carrier fluid, and therefore a lower transit speed of the carrier fluid through the thermal exchange units 7, consequently allowing more time for the carrier fluid to exchange heat.

To summarize, the step of driving the opening or closure of the flow rate controller 8 includes the steps of:
increasing the target value of the control parameter for driving the opening of the flow regulator 8; and
reducing the target value of the control parameter for driving the closing of the flow regulator 8,
and wherein:
if the target value of the control parameter is greater than the detected value of the control parameter, the process drives the opening of the flow regulator 8 by said predefined amount,
if the target value of the control parameter is lower than the detected value of the control parameter, the process drives the closing of the flow regulator 8 by said predefined amount.

It should also be noted that, on the basis of the previously described circuit 2, opening or closing the flow controller 8 of one of the channels 5 causes a simultaneous change in the detected value of the control parameter in at least said channel 5. For example, the opening or closing of the flow rate controller 8 of one or more of the channels 5 determines in all the remaining channels 5 of the circuit 2 a change in the respective detected values of the control parameters of said remaining channels 5.

In an embodiment, the present control process 1000 comprises executing the thermal optimization procedure 100 iteratively in a loop, such that the verification steps 110 and 120 and the implementation steps 111 and 121 are periodically executed. For example, the thermal optimization procedure may be performed at a time frequency of X, with 5<X<20 min.

The control process 1000 may further comprise a hydraulic optimization procedure 200 comprising a step 201 of detecting, for each channel 5, the opening fraction Af of the flow rate controller 8: the opening fraction Af of the flow rate controller 8, as described above in the description of the plant, is defined with respect to the maximum opening of the flow rate controller 8.

The hydraulic optimization procedure further includes the step 210 of comparing, for each channel 5, the opening fraction Af of the flow controller 8 with a first threshold opening fraction B1. The step 210 may include verifying if the opening fraction Af of the flow controller 8 is greater than the first threshold opening fraction B1 as follows.

$$A_f > B1 \quad (210)$$

If, for at least one channel 5, the opening fraction of the flow controller 8 is greater than the first threshold opening fraction, the hydraulic optimization procedure 200 commands to executed a step 211 of increasing the setting of the pump 20 of the central heat treatment unit 6. The step 211 of increasing the setting of the pump 20 may include a step of increasing a rotational speed of the electric motor of the pump 20 to increase the hydraulic head supplied to the carrier fluid. The first threshold opening fraction is comprised between 93% and 99%, more particularly comprised between 94% and 96%, more particularly substantially 95%. The occurrence of the condition 210 ("Y"), so that the opening fraction Af, of the flow rate regulator 8 of at least one channel among all the channels 5, is greater than the first threshold opening fraction B1 represents a situation wherein said channel 5 has the flow rate regulator 8 almost completely open in order to receive the greatest possible amount of carrier fluid to be able to satisfy the thermal requirements of the channel 5. For this reason, when condition 210 occurs, the hydraulic optimization procedure involves increasing the setting of pump 20.

The hydraulic optimization procedure may further comprise a step 220 of comparing, for each channel 5, the opening fraction Af of the flow rate controller 8 with a second threshold opening fraction B2: for example, the step 220 comprises verifying the following condition for which the opening fraction Af of the flow rate controller 8 is smaller than the second threshold opening fraction B2:

$$A_f < B2 \quad (220)$$

wherein the second threshold opening fraction B2 is a smaller value than the first threshold opening fraction B1. For example, the second threshold opening fraction may be comprised between 85% and 92%, more particularly comprised between 87% and 91%, for example substantially equal to 90%.

If, for all channels 5, the opening fraction of the flow regulator 8 is smaller than the second threshold opening fraction, the hydraulic optimization procedure commands the execution of a step 221 for reducing the setting of the pump 20 in order to decrease the hydraulic head supplied to the carrier fluid by the pump 20.

The hydraulic optimization procedure involves that, for each channel 5, the step 210 of comparing the opening fraction Af with the first threshold opening fraction B1 is temporally preceded by the step 220 of comparing the opening fraction Af of the flow controller 8 with the second threshold opening fraction B2, as shown in the flow diagram of FIG. 2. The execution of step 220 of comparing the opening fraction Af of the flow rate controller 8 with the second threshold opening fraction B2 may be subject to a condition ("N") wherein the opening fraction Af of the flow rate controller 8 is smaller than the first threshold opening fraction B1.

The hydraulic optimization procedure 200 is preferably performed subsequent to the thermal optimization procedure 100: for example, for each channel 5, the steps 210, 220 of comparing the opening fraction Af with the first, and optionally with the second, threshold opening fraction B1, B2 is subsequent to the step of comparing the environmental differential index $I_{da}$ with the respective environmental threshold parameter A1.

The hydraulic optimization procedure may also be subject to a condition whereby the differential fluid index is, in absolute value, greater than the threshold fluid parameter and whereby the environmental differential index is, in absolute value, greater than the environmental threshold parameter A1.

Alternatively or additionally, the hydraulic optimization procedure may further be subject to a condition that at least one of the step 111 and the step 121 of the thermal optimization procedure has been executed.

In a preferred embodiment, the thermal optimization procedure and the hydraulic optimization procedure are executed sequentially and iteratively in a loop.

The control process 1000 may optionally include a pressure optimization procedure, not shown in the flow chart in FIG. 2, comprising the steps of:

- detecting, for each channel, the control parameter representative of the pressure difference between the upstream section 5a and downstream section 5b of channel 5.
- comparing, for each channel 5, the control parameter with a respective threshold control parameter. The pressure optimization procedure further comprises the steps, if the control parameter is in absolute value greater than the threshold control parameter, of driving the closure the flow rate controller 8 of the respective channel 5, and/or reducing the setting of the at least one pump 20 of the central thermal treatment group 6. The threshold control parameter may be a predefined value, a value dependent on a type of plant 1, or a value defined during a setting procedure of the plant 1.

The control process 1000 may further include a central group optimization procedure 300, shown schematically in the flowchart of FIG. 2, comprising a step 301 of detecting the setting Sp of the pump 20 of the central group 6, and a step 310 of comparing the setting Sp of the pump 20 with a respective first threshold setting C1. For example, the step 310 includes verifying whether the current setting Sp of the at least one pump 20 is greater than a respective first threshold setting C1 as follows:

$$S_p > C1 \qquad (310)$$

If the condition 310 is verified ("Y"), the optimization procedure of the central unit 300 commands a step 311 of increasing the regulation of the thermal unit 11. The regulation of the thermal unit 11 allows to vary, between a minimum and a maximum value, the thermal energy supplied to the carrier fluid by the thermal unit 11: for example, an increase in the regulation of the thermal unit 11 can determine an increase in the temperature of the carrier fluid at the outlet of the central unit and at the inlet in the upstream section 5a of the channels 5.

The central group optimization procedure may further comprise a step 320 of comparing the setting of the pump 20 with a respective second threshold setting C2: for example, the step 320 includes verifying that the setting of the pump 20 is lower than the second threshold setting C2 as follows:

$$S_p < C2 \qquad (320)$$

wherein the second threshold setting C2 is smaller than the first threshold setting C1. For example, the second threshold setting C2 may be comprised between 85% and 92%, more particularly comprised between 87% and 91%, for example substantially equal to 90%.

If the detected setting Sp of the pump(s) 20 is smaller than the respective second threshold setting C2, the hydraulic optimization procedure includes a step 321 of reducing the regulation of the thermal unit 11.

As evident from the flowchart of FIG. 2, the step 310 of comparing the setting Sp of the pump 20 with the respective first threshold setting C1 precedes to the step 320 of comparing the setting Sp of the pump 20 with the respective second threshold setting C2. For example, the central group optimization procedure provides that the execution of the step 320 of comparing the setting Sp of the pump 20 with the respective second threshold setting C2 is subject to the condition that the detected setting Sp of the pump 20 is lower than the respective first threshold setting C1. In other words, the step 320 is performed if the condition of the step 310 is not verified ("N").

In an embodiment, the central group optimization procedure 300 is performed subsequently to the thermal optimization procedure 100 and optionally also subsequently to the hydraulic optimization procedure 200. In fact, as evident from the flowchart of FIG. 2, the hydraulic optimization procedure 200 is temporally interposed between the thermal optimization procedure 100 and the central group optimization procedure 300.

In greater detail, the thermal optimization procedure 100, the hydraulic optimization procedure 200 and the central group optimization procedure 300 are executed in series with each other in this order, so that, at the end of the central group optimization procedure 300, the control process 1000 executes again in loop the thermal optimization procedure 100, the hydraulic optimization procedure 200 and the central group optimization procedure 300.

Following the hydraulic optimization procedure or the end of the thermal procedure, the control process involves executing again the initial step 101 of measuring the parameters.

The thermal optimization procedure, the hydraulic optimization procedure and the central group optimization procedure 300 may be performed at different time intervals from each other. According to a preferred embodiment, the thermal optimization procedure 100 is performed at a time frequency X, the hydraulic optimization procedure 200 at a time frequency Y, and the central group optimization procedure 300 at a time frequency Z, wherein X<Y<Z. The time frequency is defined as the inverse of the frequency of execution of said procedures. The time frequency is defined as the time interval interposed between a preceding and a subsequent execution of the same optimization procedure.

For example, time frequency X is comprised between 5 and 20 minutes, time frequency Y is comprised between 10 and 40 minutes, and time frequency Z is comprised between 60 and 240 minutes.

The optimization procedures 100, 200 and 300 of each channel may be executed simultaneously with each other: for example, the thermal optimization procedure 100 of a first channel 5 may be executed simultaneously with the thermal optimization procedure 100 of a second channel. Similarly, the optimization procedures 100, 200 and 300 executed in relation to a first channel 5 may be executed in parallel with the optimization procedures 100, 200 and 300 of a second channel 5 of the same circuit 5.

Finally, it should be noted that throughout the foregoing description and claims reference has been made to actual or measured values of parameters (e.g. of the operating parameter) which are set or controlled in order to comply with desired values imposed by the user or designer; this is to be understood in the sense that both point values and alternatively ranges or thresholds of acceptability may be provided for each parameter, within which the measured value of a parameter may be considered to comply with the desired value.

Advantages of the Invention

The plant 1 and the control process described above lead to numerous advantages over the known art.

The above-described plant and the process for air conditioning and/or heating are extremely energy-efficient as they enable the plant to meet the required thermal conditions with minimal energy consumption. In fact, the unit 50 (or other control implementing the process) is able to accurately regulate the power (energy) given or received by each heat exchange unit 7 and/or automatically monitor and regulate the components of each channel 5 and the central unit 6 for ensuring high energy efficiency and compliance with user or designer settings.

Furthermore, thanks to the sensors provided, unit 50 is able to monitor and control the flow rate, temperature difference and heat exchange in each channel 5 of the plant.

Thanks to the control process and the optimization cycle, it is possible to minimize pressure losses and thus achieve an optimum hydraulic condition.

Thus, the control device 15 may be able to perform:
an optimized and real-time management of the plant 1 according to performance parameters and/or energy efficiency strategies,
the calibration of the plant 1 at the time of installation (setting of plant parameters consistent with the set points defined by the designer) can be carried out either on site or from a location remote from the plant,
automatic real-time restoration of the optimal conditions of plant 1 under all operating conditions (restoration of plant parameters to the set points defined by the designer).

The automatic adjustments performed by the control device 15, and in any case the control process described above, make the plant 1 highly flexible in its implementation and use. In fact, the process and the plant described herein can also be achieved by upgrading old air conditioning and/or heating plants.

Below are some typical examples of actions on plants for air-conditioning and/or heating (upgrading) that can be managed by the control unit 50 to ensure high energy efficiency.

In addition, the improvement of the thermal characteristics of the building—for example a replacement of windows and doors or an increase in the degree of insulation (roofing, replacement of the roof covering, etc.)—would be easily managed by plant 1. In the face of the changed (reduced) thermal power requirements, the plant 1 will allow the individual thermal exchange units 7 to be supplied with the power they really need. The plant 1 then makes it possible to monitor the thermal absorption and thus provide useful data for calculating consumption and thus the economic return following the improvement intervention.

The possible replacement of a heat exchange unit 7 is automatically recognized thanks to the control process, by the unit 50, which in any case will try to meet the energy parameters without external intervention.

Even in the case of an expansion of a plant, the control process allows to fully automatically deal with load changes resulting from the addition of one or more branches.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A process to control a plant for air conditioning and/or heating, said plant comprising:
at least one circuit for distributing a carrier fluid, said at least one circuit comprising:
at least one delivery line for the carrier fluid,
at least one return line for the carrier fluid, and
at least one central thermal treatment group placed on said at least one circuit;
two or more channels, each of which is hydraulically interposed between said delivery line,
wherein said return line configured to serve respective environments to be air conditioned and/or heated,
for each of said channels, the plant further comprises:
at least one respective thermal exchange unit operating on each of said channels to serve a respective environment to be air conditioned and/or heated,
at least one flow regulator operating on each of said channels and configured to regulate a flow of carrier fluid crossing the respective channel,
at least one ambient temperature detector for each channel, said at least one ambient temperature detector being configured for detecting an ambient temperature relative to the environment to be air conditioned and/or heated served by said channel,
at least one temperature detector for the carrier fluid operating on each of said channels, said at least one temperature detector for the carrier fluid being configured for detecting:
a delivery temperature of the carrier fluid in each channel, said delivery temperature being detected in an upstream section of the channel placed upstream with respect to all the thermal exchange units of said channel,
a return temperature of the carrier fluid in each channel, said return temperature being detected in a downstream section of the channel placed downstream with respect to all the thermal exchange units of said channel,
wherein said process includes a thermal optimization procedure comprising:
calculating, for each channel, a respective environmental differential index representative of a difference between:
a parameter representative of said delivery temperature and/or return temperature of the carrier fluid of the respective channel, and
said ambient temperature relative to the environment served by the respective channel, calculating, for each channel, a respective differential fluid index representative of a difference between the delivery temperature and return temperature of the carrier fluid;

comparing, for each channel, said respective environmental differential index with a respective environmental threshold parameter, so that if said environmental differential index is, in absolute value, lower than said environmental threshold parameter, the process comprises the step of driving the opening of the flow regulator of the respective channel; and comparing, for each channel, said differential fluid index with a respective threshold fluid parameter, so that if said differential fluid index is, in absolute value, lower than said threshold fluid parameter, the process comprises the step of driving the closing of the flow regulator of the respective channel.

2. The process according to claim 1, wherein execution for each channel of the step of comparing said differential fluid index with the respective threshold fluid parameter, is subordinate to a condition where said environmental differential index is, in absolute value, greater than or equal to said environmental threshold parameter.

3. The process according to claim 1, wherein the step of driving the closing of the flow regulator of the respective channel is subordinate to a condition wherein:

said environmental differential index is, in absolute value, greater than or equal to said environmental threshold parameter; and said differential fluid index is, in absolute value, lower than said threshold fluid parameter, wherein the process provides for executing the thermal optimization procedure iteratively in a loop.

4. The process according to claim 1, wherein said plant comprises, for each channel, at least one control detector operative on the respective channel and configured for detecting at least one value of a control parameter representative of: a flow of the carrier fluid in said respective channel, and/or a differential pressure between said upstream section and said downstream section of the channel, wherein the step of driving the opening and/or closing of the flow regulator of each channel comprises the step of opening and/or closing said flow regulator by a predefined amount, said predefined amount being determined as a function of at least one target value of said control parameter, and wherein the thermal optimization procedure comprises the steps of:

detecting said at least one value of the control parameter;

defining said at least one target value of the control parameter;

driving the opening or the closing of the flow regulator such that said at least one detected value of the control parameter is substantially equal to said target value of the control parameter.

5. The process according to claim 4, wherein the step of defining said at least one target value of the control parameter is executed as a function of a value taken by at least one between:

the environmental differential index, the differential fluid index, the comparison between said environmental differential index and the respective environmental threshold parameter, and the comparison between said differential fluid index and the respective threshold fluid parameter.

6. The process according to claim 5, wherein the step of defining said at least one target value of the control parameter comprises a step of reducing the target value of the control parameter with the decrease of the value of the differential fluid index, and wherein the step of defining said at least one target value of the control parameter comprises a step of increasing the target value of the control parameter with the decrease of the value of the environmental differential index.

7. The process according to claim 4, wherein the step of driving the opening or closing of the flow regulator comprises the steps of:

increasing the target value of the control parameter for driving the opening of the flow regulator; and reducing the target value of the control parameter for driving the closing of the flow regulator, wherein:

if the target value of the control parameter is greater than the detected value of the control parameter, the process drives the opening of the flow regulator by said predefined amount, and if the target value of the control parameter is lower than the detected value of the control parameter, the process drives the closing of the flow regulator by said predefined amount.

8. The process according to claim 4, wherein the control detector of each channel is a differential pressure detector comprising:

an upstream pressure inlet operatively connected to the upstream section of the channel, and a downstream pressure inlet, operatively connected to the downstream section of the channel, wherein said control parameter being representative of the differential pressure between said upstream section and said downstream section of the respective channel.

9. The process according to claim 8, wherein the flow regulator is arranged on the downstream section of the channel, and the downstream pressure inlet of the control detector is arranged upstream of the flow regulator; or wherein the flow regulator is arranged on the upstream section of the channel, and the downstream pressure inlet of the control detector is arranged downstream of the flow regulator, in particular wherein the upstream pressure inlet of the control detector is arranged downstream of the flow regulator.

10. The process according to claim 1, wherein the environmental differential index comprises, for each channel, at least one between:

a difference or a ratio between the delivery temperature of the carrier fluid and the ambient temperature relative to the channel;

a difference or a ratio between the return temperature of the carrier fluid and the ambient temperature relative to the channel;

a difference or a ratio between an average temperature of the carrier fluid and the ambient temperature relative to the channel, said average temperature being calculated as arithmetic mean between the delivery temperature and the return temperature of the carrier fluid, wherein the differential fluid index comprises an arithmetic difference or a ratio between the delivery temperature and the return temperature of the carrier fluid relative to each channel, wherein the environmental threshold parameter is comprised between 8° C. and 55° C., and
wherein the threshold fluid parameter is comprised between 2° C. and 20° C.

11. The process according to claim 10, wherein:
if the central thermal treatment group comprises a heat generator and the thermal exchange units comprise radiators, the environmental threshold parameter in a range of 40° C. to 50° C.;
if the central thermal treatment group comprises a heat pump with exchanger, the environmental threshold parameter is in a range of 20° C. to 30° C.;
if the central thermal treatment group comprises a cold generation system, the environmental threshold parameter is in a range of 10° C. to 15° C.,
wherein:
if the central thermal treatment group comprises a heat generator, the threshold fluid parameter is in a range of 5° C. to 15° C.;
if the central thermal treatment group comprises a cold generation system, the threshold fluid parameter is in a range of 3° C. to 7° C.

12. The process according to claim 1, wherein:
the flow regulator is drivable in a plurality of regulation positions between a maximum closure condition and a maximum open condition of the flow regulator, said plurality of regulation positions each defining an opening fraction with respect to said maximum opening,
wherein the central thermal treatment group comprises at least one pump operating in the circuit and configured for supplying a hydraulic head to the carrier fluid in order to determine circulation of the carrier fluid in the circuit, said hydraulic head being variable based on a variable setting of said pump between a minimum value and a maximum value; and
wherein said process includes a hydraulic optimization procedure comprising:
detecting, for each channel, the opening fraction of the flow regulator;
comparing, for each channel, said opening fraction with a first threshold opening fraction; and
if, for at least one channel, said opening fraction of the flow regulator is greater than said first threshold opening fraction, increasing the setting of the pump,
wherein said first threshold opening fraction is in a range of 93% to 99%.

13. The process according to claim 12, wherein the hydraulic optimization procedure further comprises:
comparing, for each channel, said opening fraction of the flow regulator with a second threshold opening fraction, said second threshold opening fraction being lower than said first threshold opening fraction;
if, for all the channels, said opening fraction of the flow regulator is lower than said second threshold opening fraction, reducing the setting of the pump,
wherein said second threshold opening fraction is in a range of 85% to 92%,
wherein, for each channel, the step of comparing said opening fraction with the first threshold opening fraction precedes the step of comparing said opening fraction of the flow regulator with the second threshold opening fraction,
the execution of the step of comparing said opening fraction of the flow regulator with a second threshold opening fraction being subject to the condition that said opening fraction of the flow regulator is lower than said first threshold opening fraction,
wherein, for each channel, the hydraulic optimization procedure is executed following the respective thermal optimization procedure, and
wherein the process provides for executing the thermal optimization procedure and the hydraulic optimization procedure sequentially and iteratively in a loop.

14. The process according to claim 12, wherein the central thermal treatment group comprises at least one thermal unit selected between a heating unit and a cooling unit and configured for delivering a thermal heating or cooling energy, said thermal energy being variable based on a regulation of said thermal unit variable between a minimum value and a maximum value, and
wherein the process includes a central group optimization procedure comprising the steps of:
detecting the setting of said at least one pump;
comparing said setting of the pump with a respective first threshold setting;
if said detected setting of the pump is greater than the respective first threshold setting,
increasing the regulation of the thermal unit,
wherein said first threshold setting of the pump is comprised between 93% and 99%.

15. The process according to claim 14, wherein the central group optimization procedure further comprises:
comparing said setting of the pump with a respective second threshold setting, wherein said second threshold setting is lower than the first threshold setting;
if said detected setting of the pump is lower than the respective second threshold setting, reducing the regulation of the thermal unit,
wherein said second threshold setting is comprised between 85% and 92%,
wherein the step of comparing the setting of the pump with the respective first threshold setting precedes the step of comparing said setting of the pump with the respective second threshold setting,
the execution of the step of comparing said setting of the pump with the respective second threshold setting being subordinate to the condition that said detected setting of the pump is lower than the respective first threshold setting.

16. The process according to claim 14, wherein the hydraulic optimization procedure is temporally interposed between the thermal optimization procedure and the central group optimization procedure,
wherein the thermal optimization procedure, the hydraulic optimization procedure and the central group optimization procedure are executed in series with each other in this order,
wherein, at the end of the central group optimization procedure, the process newly executes, in a loop, the thermal optimization procedure, the hydraulic optimization procedure and, optionally, the central group optimization procedure.

17. The process according to claim 16, wherein the process executes:
the thermal optimization procedure with a time frequency X;
the hydraulic optimization procedure with a time frequency Y;
the central group optimization procedure with a time frequency Z;
wherein X is less than Y and Y is less than Z, the time frequency X is in a range of 5 to 20 minutes, the time frequency Y is in a range of 10 to 40 minutes, and the time frequency Z is in a range of 60 to 240 minutes.

18. A process of controlling a plant for air conditioning and/or heating, said plant comprising
- at least one circuit for distributing a carrier fluid, said at least one circuit including at least one delivery line for the carrier fluid, and at least one return line for the carrier fluid, and
- at least one central thermal treatment group placed on said at least one circuit;
- two or more channels, each of which is hydraulically interposed between said delivery line, and said return line in order to serve respective environments to be air conditioned and/or heated,
- for each of said channels, the plant also comprising:
  - at least one respective thermal exchange unit operating on each of said channels to serve a respective environment to be air conditioned and/or heated,
  - at least one flow regulator operating on each of said channels and configured to regulate a flow of carrier fluid crossing the respective channel,
  - at least one ambient temperature detector for each channel, said at least one ambient temperature detector being configured for detecting an ambient temperature relative to the environment to be air conditioned and/or heated served by said channel,
  - at least one temperature detector for the carrier fluid operating on each of said channels, said at least one temperature detector for the carrier fluid being configured for detecting a delivery temperature of the carrier fluid in each channel, said delivery temperature being detected in an upstream section of the channel placed upstream with respect to all the thermal exchange units of said channel, and a return temperature of the carrier fluid in each channel, said return temperature being detected in a downstream section of the channel placed downstream with respect to all the thermal exchange units of said channel, said process including a thermal optimization comprising:
- calculating, for each channel, a respective environmental differential index representative of a difference between: a parameter representative of said delivery temperature and/or return temperature of the carrier fluid of the respective channel, and said ambient temperature relative to the environment served by the respective channel,
- comparing, for each channel (5), said respective environmental differential index with a respective environmental threshold parameter, so that if said environmental differential index is, in absolute value, lower than said environmental threshold parameter, the process comprises the step of driving the opening of the flow regulator of the respective channel; and/or
- wherein the thermal optimization procedure comprises the steps of:
  - calculating, for each channel, a respective differential fluid index representative of a difference between the delivery temperature and return temperature of the carrier fluid;
  - comparing, for each channel, said differential fluid index with a respective threshold fluid parameter, so that if said differential fluid index is, in absolute value, lower than said threshold fluid parameter, the process comprises the step of driving the closing of the flow regulator of the respective channel.

19. A plant for air conditioning and/or heating comprising:
- a circuit for distributing a carrier fluid including a delivery line of the carrier fluid, and a return line of the carrier fluid,
- a central thermal treatment group placed on said at least one circuit,
- channels each of which are hydraulically interposed between said delivery line and said return line and configured to serve respective environments to be air conditioned and/or heated,
- wherein, for each of said channels, the plant further comprises:
  - a respective thermal exchange unit operating on each of said channels configured to serve a respective environment to be air conditioned and/or heated,
  - a flow regulator operating on each of said channels and configured to regulate a flow of carrier fluid traversing the at least one respective thermal exchange unit,
  - an ambient temperature detector for each channel, said at least one ambient temperature detector being configured for detecting an ambient temperature relative to the environment to be air conditioned and/or heated served by said channel,
  - a temperature detector of the carrier fluid operating on each of said channels, said at least one temperature detector of the carrier fluid being configured for detecting a delivery temperature of the carrier fluid in each channel, said delivery temperature being detected in an upstream section of the channel placed upstream with respect to all the thermal exchange units of said channel, and/or a return temperature of the carrier fluid in each channel, said return temperature being detected in a downstream section of the channel placed downstream with respect to all the thermal exchange units of said channel,
- a control unit operatively connected to said temperature detector of the carrier fluid, to said ambient temperature detector, to said flow regulator and optionally to the central thermal treatment group, said control unit configured to execute a thermal optimization procedure comprising:
  - calculating, for each channel, a respective environmental differential index representative of a difference between a parameter representative of said delivery temperature and/or return temperature of the carrier fluid of the respective channel, and said ambient temperature relative to the environment of the respective channel,
  - calculating, for each channel, a respective differential fluid index representative of a difference between the delivery temperature and return temperature of the carrier fluid;
  - comparing, for each channel, said respective environmental differential index with a respective environmental threshold parameter, so that if said environmental differential index is, in absolute value, lower than said environmental threshold parameter, the process comprises the step of driving the opening of the flow regulator of the respective channel;
  - comparing, for each channel, said differential fluid index with a respective threshold fluid parameter, so that if said differential fluid index is, in absolute value, lower than said threshold fluid parameter, the process comprises the step of driving the closing of the flow regulator of the respective channel.

20. The plant according to claim 19, wherein:
the flow regulator is drivable into a plurality of regulation positions between a maximum closure condition and a maximum open condition of the flow regulator, said plurality of regulation positions each defining an opening fraction with respect to said maximum opening, and wherein
the central thermal treatment group comprises at least one pump operating on the circuit and configured for supplying a hydraulic head to the carrier fluid in order to determine the circulation of the carrier fluid in the circuit, said hydraulic head being variable based on a setting of said pump variable between a minimum value and maximum value;
wherein the control unit is further configured for executing a hydraulic optimization procedure comprising the steps of:
  detecting, for each channel, the opening fraction of the flow regulator;
  comparing, for each channel, said opening fraction with a first threshold opening fraction;
  if, for at least one channel, said opening fraction of the flow regulator is higher than said first threshold opening fraction, increasing the setting of the pump,
wherein said first threshold opening fraction is comprised between 93% and 99%;
wherein the central thermal treatment group comprises at least one thermal unit selected between a heating unit and a cooling unit and configured for delivering a thermal heating or cooling energy, said thermal energy being variable based on a regulation of said thermal unit between a minimum value and a maximum value,
wherein the control unit is configured for executing a central group optimization procedure comprising the steps of:
  detecting the setting of said at least one pump;
  comparing said setting of the pump with a respective first threshold setting;
  if said detected setting of the pump is higher than the respective first threshold setting,
increasing the regulation of the thermal unit,
wherein said first threshold setting of the pump is in a range of 93% to 99%, and
wherein said control unit of the plant for air conditioning and/or heating is configured for executing the thermal optimization procedure, the hydraulic optimization procedure and the central group optimization procedure sequentially in such order and in a loop.

* * * * *